US009484066B2

(12) United States Patent
Ko et al.

(10) Patent No.: US 9,484,066 B2
(45) Date of Patent: Nov. 1, 2016

(54) IMAGE DISPLAY DEVICE AND CONTROL METHOD THEREOF

(71) Applicant: LG ELECTRONICS INC., Seoul (KR)

(72) Inventors: Eulina Ko, Seoul (KR); Donho Choi, Seoul (KR); Sungil Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/644,990

(22) Filed: Mar. 11, 2015

(65) Prior Publication Data
US 2015/0310897 A1    Oct. 29, 2015

(30) Foreign Application Priority Data

Apr. 23, 2014    (KR) .................. 10-2014-0048866

(51) Int. Cl.
| H04N 5/775 | (2006.01) |
| G11B 27/36 | (2006.01) |
| G11B 27/10 | (2006.01) |
| G11B 27/28 | (2006.01) |
| G11B 27/34 | (2006.01) |
| G11B 27/034 | (2006.01) |
| G11B 33/12 | (2006.01) |
| H04N 5/93 | (2006.01) |

(52) U.S. Cl.
CPC ............ *G11B 27/36* (2013.01); *G11B 27/034* (2013.01); *G11B 27/105* (2013.01); *G11B 27/28* (2013.01); *G11B 27/34* (2013.01); *G11B 33/121* (2013.01); *H04N 5/93* (2013.01)

(58) Field of Classification Search
CPC ........ G09G 5/22; G09G 27/34; G06F 17/30; G06F 17/30247

USPC .................. 386/230, 241, 225, 278, 282
See application file for complete search history.

(56) References Cited

U.S. PATENT DOCUMENTS

| 8,649,573 B1 | 2/2014 | Darbari et al. | |
| 8,666,223 B2 * | 3/2014 | Momosaki | G11B 27/034 386/239 |
| 2006/0013556 A1 * | 1/2006 | Poslinski | H04N 5/44543 386/250 |
| 2006/0248560 A1 * | 11/2006 | Wada | G11B 27/034 725/89 |
| 2007/0220431 A1 * | 9/2007 | Nakamura | G06F 17/30749 715/716 |
| 2008/0131073 A1 * | 6/2008 | Ogawa | G06F 17/30793 386/278 |
| 2008/0144890 A1 * | 6/2008 | Ogawa | G11B 27/034 382/118 |
| 2009/0190804 A1 * | 7/2009 | Yokoi | G06F 17/30781 382/118 |

(Continued)

FOREIGN PATENT DOCUMENTS

WO    2010/035160    4/2010

OTHER PUBLICATIONS

European Patent Office Application Serial No. 15159819.0, Search Report dated Sep. 29, 2015, 6 pages.

*Primary Examiner* — Helen Shibru
(74) *Attorney, Agent, or Firm* — Lee, Hong, Degerman, Kang & Waimey; Jonathan Kang; Harry S. Lee

(57) ABSTRACT

The present disclosure relates to an image display device including a display unit for playing video and a control method thereof, and the method may include selecting at least one of characters contained in video, searching at least one region containing the selected character within the entire region of a frame using at least one frame provided in the video, extracting a major playback section containing the selected character based on at least one of the size and location of the retrieved at least one region, and playing the extracted major playback section.

16 Claims, 24 Drawing Sheets

(56) References Cited

U.S. PATENT DOCUMENTS

| | | | | |
|---|---|---|---|---|
| 2012/0084671 A1* | 4/2012 | Enete | ............... | H04L 12/1822 715/756 |
| 2013/0124990 A1* | 5/2013 | Lettau | ............... | G11B 27/34 715/716 |
| 2013/0215144 A1 | 8/2013 | Anzai et al. | | |
| 2013/0275411 A1* | 10/2013 | Kim | ............... | G06F 17/30277 707/722 |
| 2014/0086556 A1* | 3/2014 | Yoshida | ............... | H04N 9/79 386/241 |
| 2014/0213318 A1* | 7/2014 | Leem | ............... | G06F 3/0486 455/556.1 |
| 2014/0229888 A1* | 8/2014 | Ko | ............... | G06F 3/04886 715/783 |

\* cited by examiner

IMAGE DISPLAY DEVICE AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2014-0048866, filed on Apr. 23, 2014, the contents of which is incorporated by reference herein in its entirety.

BACKGROUND OF THE INVENTION

1. Field of the Invention

The present disclosure relates to an image display device including a display unit for playing video and a control method thereof.

2. Description of the Related Art

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. For an example, a terminal may be implemented as an image display device for recoding and playing videos and audios.

Various new attempts have been made in the aspect of hardware or software in order to implement such complicated functions in the multimedia player. For an example, there is provided a user interface environment associated with video playback such as fast winding or rewinding video.

Furthermore, functional changes and enhancements for allowing a user to more conveniently use an image display device are required. An image display device for playing a major playback section and a user interface associated with the major playback section may be taken into consideration as one of the functional changes and enhancements.

SUMMARY OF THE INVENTION

An aspect of the present disclosure is to provide an image display device capable of selectively playing a major playback section associated with at least one of characters shown in video, and a control method thereof.

Furthermore, another aspect of the present disclosure is to provide an image display device capable of notifying the playback progress status of a major playback section using a different progress bar, and a control method thereof.

In addition, still another aspect of the present disclosure is to provide an image display device capable of indicating the feature of a character while displaying a progress bar showing the playback progress status of video.

In order to accomplish the foregoing objective, there is provided a method of controlling an image display device, and the method may include selecting at least one of characters contained in video, searching at least one region containing the selected character within the entire region of a frame using at least one frame provided in the video, extracting a major playback section containing the selected character based on at least one of the size and location of the retrieved at least one region, and playing the extracted major playback section.

According to an embodiment, the control method may further include displaying a progress bar indicating a playback state of the video, and the progress bar may include at least one of a first progress bar corresponding to the entire playback section and a second progress bar corresponding to the major playback section.

According to an embodiment, the major playback section may include a plurality of sections spaced apart in time on the entire playback section.

According to an embodiment, sections contained in the major playback section on the first progress bar may be highlighted to be distinguished from sections that are not contained in the major playback section.

According to an embodiment, the method may further include displaying a different image corresponding to each of the plurality of sections at a location adjacent to the progress bar.

According to an embodiment, the method may further include producing the significance of the selected character for each of the plurality of sections, and displaying different sized images according to the calculated significance at locations corresponding to the plurality of sections on the first progress bar.

According to an embodiment, the significance of the selected character may be calculated based on at least one of the size and location of the retrieved at least one region.

According to an embodiment, said playing the extracted major playback section may consecutively play frames contained in the plurality of sections.

According to an embodiment, said selecting the at least one character may include searching a character contained in a paused screen when the playback of the video is paused, displaying a graphic object formed to select the retrieved character on the paused screen, and selecting the retrieved character when a touch is applied to the graphic object.

According to an embodiment, the method may further include editing at least one of the size and location of a region which is a reference for extracting the major playback section based on a user input.

In addition, in order to accomplish the foregoing objective, an image display device according to an embodiment of the present disclosure may include a display unit configured to display at least one of frames provided in video, and a controller configured to select at least one of characters contained in video when a specific character playback mode is executed, and search at least one region containing the selected character within the entire region of the frame using the frames, and extract a major playback section containing the selected character based on at least one of the size and location of the retrieved at least one region, and play the extracted major playback section.

According to an embodiment, a progress bar indicating a playback state of the video may be displayed on the display unit, and the progress bar may include at least one of a first progress bar corresponding to the entire playback section and a second progress bar corresponding to the major playback section.

According to an embodiment, the major playback section may include a plurality of sections spaced apart in time on the entire playback section.

According to an embodiment, sections contained in the major playback section on the first progress bar may be highlighted to be distinguished from sections that are not contained in the major playback section.

According to an embodiment, the controller may display a different image corresponding to each of the plurality of sections at a location adjacent to the progress bar.

According to an embodiment, the controller may calculate the significance of the selected character for each of the plurality of sections, and display different sized images according to the calculated significance.

According to an embodiment, the significance of the selected character may be calculated based on at least one of the size and location of the retrieved at least one region.

According to an embodiment, the playback of the extracted major playback section consecutively may play frames contained in the plurality of sections.

According to an embodiment, the controller may search a character contained in a paused screen when the playback of the video is paused, and display a graphic object formed to select the retrieved character on the paused screen.

According to an embodiment, at least one of the size and location of a region which is a reference for extracting the major playback section may vary based on a user input.

An image display device according to an embodiment of the present disclosure may extract a major playback section based on at least one of the size and location of a region containing a specific character in the entire region of a frame, and play the extracted major playback section. As a result, the user may selectively view a major portion other than the entire video.

In addition, an image display device according to an embodiment of the present disclosure may calculate a figure significance based on at least one of the size and location of a region containing a character while displaying a progress bar, and display a different image according to the calculated figure significance. Since a relatively larger image is displayed as increasing the significance, a user may check a weight of a specific character or a relation with another character using a different image displayed adjacent to the progress bar.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Image display devices described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the image display devices.

Figure 1A:
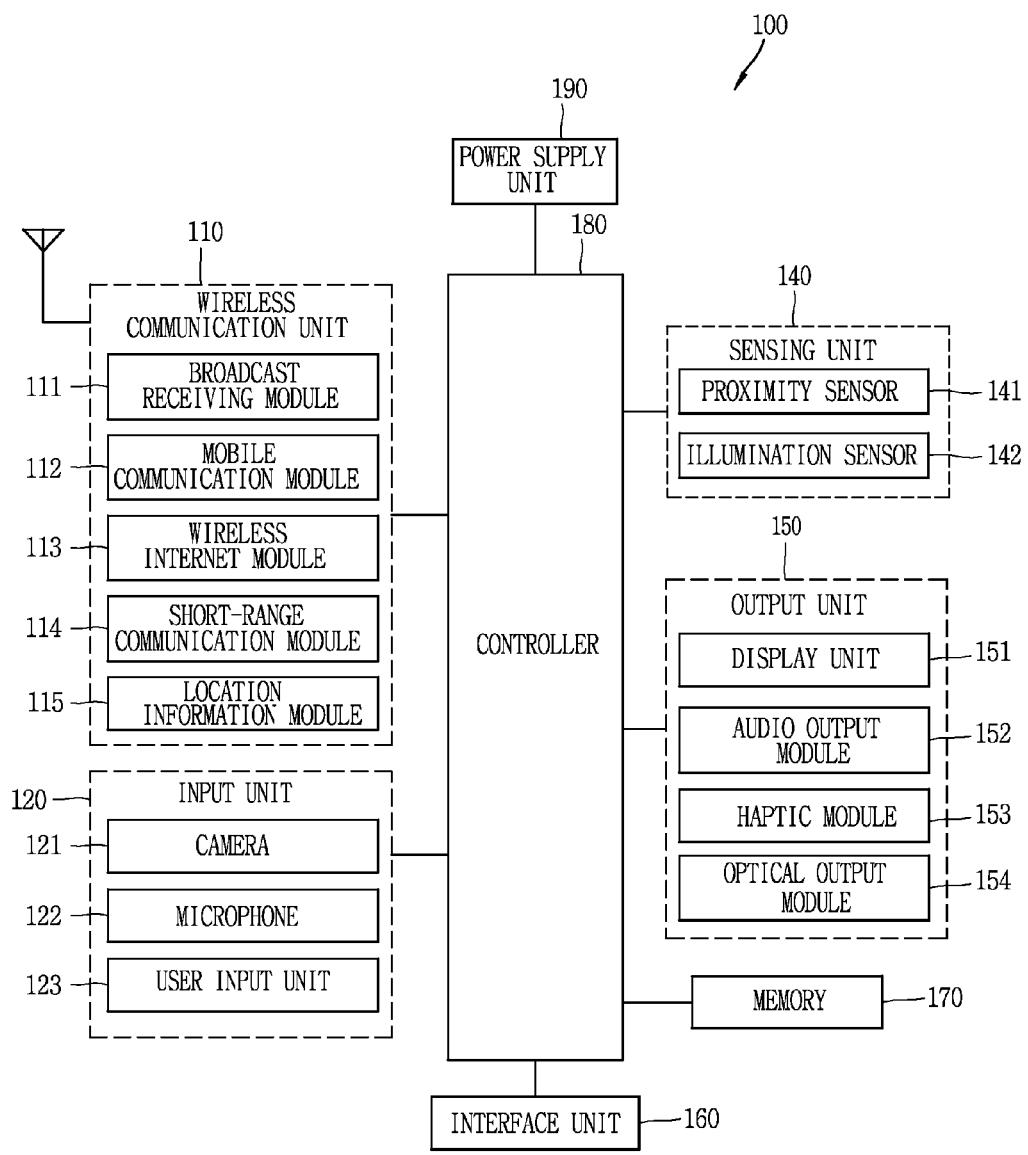
FIG. 1A is a block diagram illustrating a mobile terminal associated with the present disclosure.
Figure 1B:
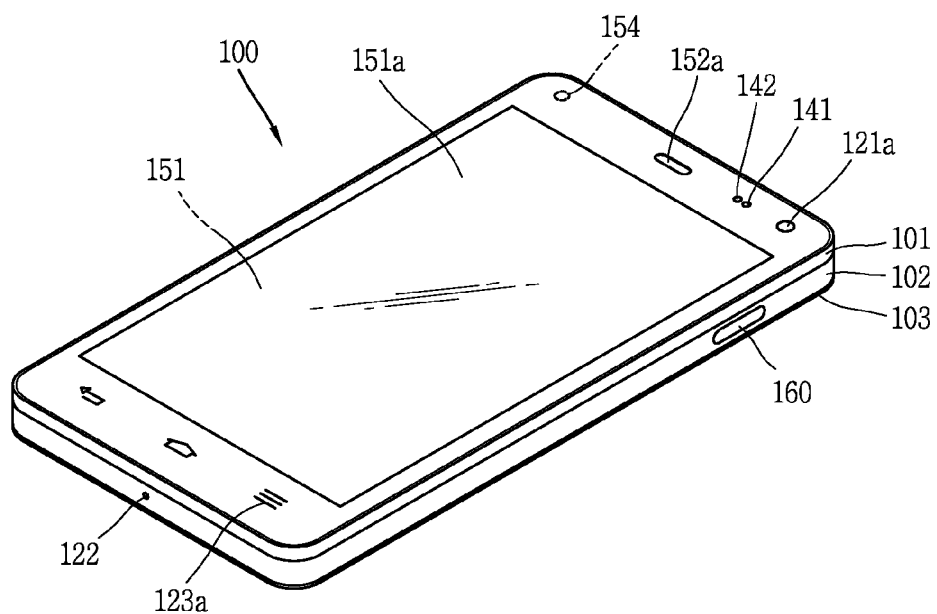
FIGS. 1B and 1C conceptual views in which an example of a mobile terminal associated with the present disclosure is seen from different directions.
Figure 1C:
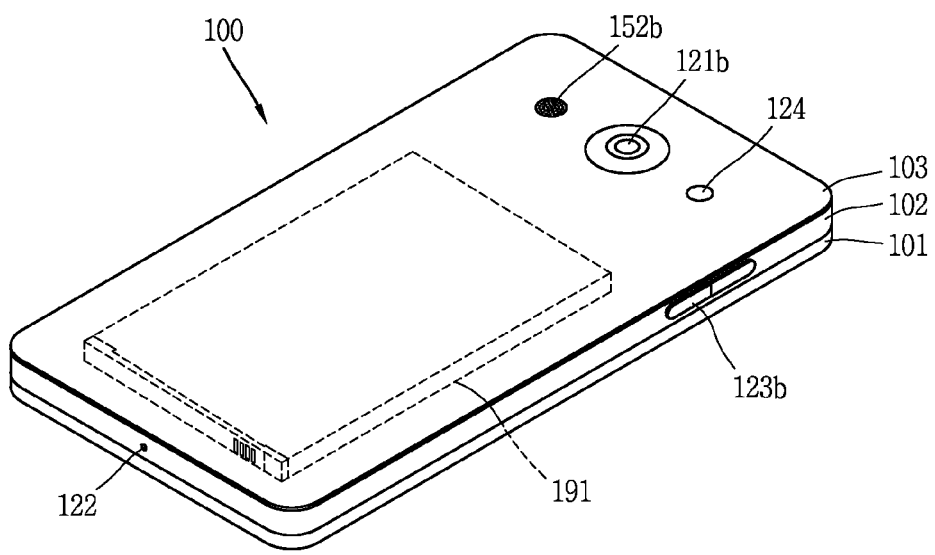

FIG. 1A is a block diagram of an image display device in accordance with the present disclosure, FIGS. 1B and 1C are conceptual views of one example of the image display device, viewed from different directions.

The image display device 100 may include components, such as a wireless communication unit 110, an input unit 120, a sensing unit 140, an output unit 150, an interface unit 160, a memory 170, a controller 180, a power supply unit 190 and the like. FIG. 1A illustrates the image display device having various components, but it may be understood that implementing all of the illustrated components is not a requirement. Greater or fewer components may alternatively be implemented.

In more detail, the wireless communication unit 110 of those components may typically include one or more modules which permit wireless communications between the image display device 100 and a wireless communication system, between the image display device 100 and another image display device 100, or between the image display device 100 and a network within which another image display device 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the image display device, a surrounding environment of the image display device and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the image display device disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the image display device 100 and a user, as well as functioning as the user input unit 123 which provides an input interface between the image display device 100 and the user.

The interface unit 160 may serve as an interface with various types of external devices connected with the image display device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The image display device 100 may execute an appropriate control associated with a connected external device, in response to the external device being connected to the interface unit 160.

The memory 170 may store a plurality of application programs (or applications) executed in the image display device 100, data for operations of the image display device 100, instruction words, and the like. At least some of those application programs may be downloaded from an external server via wireless communication. Some others of those application programs may be installed within the image display device 100 at the time of being shipped for basic functions of the image display device 100 (for example, receiving a call, placing a call, receiving a message, sending a message, etc.). On the other hand, the application programs may be stored in the memory 170, installed in the image display device 100, and executed by the controller 180 to perform an operation (or a function) of the image display device 100.

The controller 180 may typically control an overall operation of the image display device 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the image display device 100 for operation.

The power supply unit 190 may receive external power or internal power and supply appropriate power required for operating respective elements and components included in the image display device 100 under the control of the controller 180. The power supply unit 190 may include a battery, and the battery may be an embedded battery or a replaceable battery.

At least part of those elements and components may be combined to implement operation and control of the image display device or a control method of the image display device according to various exemplary embodiments described herein. Also, the operation and control or the control method of the image display device may be implemented in the image display device in such a manner of activating at least one application program stored in the memory 170.

Hereinafter, each aforementioned component will be described in more detail with reference to FIG. 1A, prior to explaining various exemplary embodiments implemented by the image display device 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the image display device 100 to simultaneously receive at least two broadcast channels or switch the broadcast channels.

The mobile communication module 112 may transmit/receive wireless signals to/from at least one of network entities, for example, a base station, an external image display device, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the image display device 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the image display device 100 and a wireless communication system, between the image display device 100 and another image display device 100, or between the image display device and a network where another image display device 100 (or an external server) is located, via wireless personal area networks.

Here, the another image display device 100 may be a wearable device, for example, a smart watch, a smart glass or a head mounted display (HMD), which is able to exchange data with the image display device 100 (or to cooperate with the image display device 100). The short-range communication module 114 may sense (recognize) a wearable device, which is able to communicate with the image display device), near the image display device 100. In addition, when the sensed wearable device is a device which is authenticated to communicate with the image display device 100 according to the present disclosure, the controller 180 may transmit at least part of data processed in the image display device 100 to the wearable device via the short-range communication module 114. Hence, a user of the wearable device may use the data processed in the image display device 100 on the wearable device. For example, when a call is received in the image display device 100, the user may answer the call using the wearable device. Also, when a message is received in the image display device 100, the user may check the received message using the wearable device.

The location information module 115 denotes a module for detecting or calculating a position of the image display device. An example of the location information module 115 may include a Global Position System (GPS) module or a Wi-Fi module. For example, when the image display device uses the GPS module, a position of the image display device may be acquired using a signal sent from a GPS satellite. As another example, when the image display device uses the Wi-Fi module, a position of the image display device may be acquired based on information related to a wireless access point (AP) which transmits or receives a wireless signal to or from the Wi-Fi module.

Hereinafter, the input unit 120 will be described in more detail. The input unit 120 may be configured to provide an audio or video signal (or information) input to the image display device or information input by a user to the image display device. For the input of the audio information, the image display device 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the image display device 100 may be arranged in a matrix configuration. By use of the cameras 121 having the matrix configuration, a plurality of image information having various angles or focal points may be input into the image display device 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the image display device 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the image display device 100 to correspond to the input information. The user input unit 123 may include a mechanical input element (or a mechanical key, for example, a button located on a front/rear surface or a side surface of the image display device 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the image display device, surrounding environment information of the image display device and user information, and generate a sensing signal corresponding to it. The controller 180 may control an operation of the image display device 100 or execute data processing, a function or an operation associated with an application program installed in the image display device based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the image display device covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the image display device 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the image display device 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the image display device 100. For example, the display unit 151 may display execution screen information of an application program driven in the image display device 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the image display device 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the image display device 100.

An optical output module 154 may output a signal for indicating an event generation using light of a light source. Examples of events generated in the image display device 100 may include a message reception, a call signal reception, a missed call, an alarm, a schedule notice, an email reception, an information reception through an application, and the like.

A signal output by the optical output module 154 may be implemented in such a manner that the image display device emits monochromatic light or light with a plurality of colors. The signal output may be terminated as the image display device senses a user's event checking.

The interface unit 160 may serve as an interface with every external device connected with the image display device 100. For example, the interface unit 160 may receive data transmitted from an external device, receive power to transfer to each element within the image display device 100, or transmit internal data of the image display device 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the image display device 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the image display device 100 is connected with an external cradle, the interface unit 160 may serve as a passage to allow power from the cradle to be supplied to the image display device 100 therethrough or may serve as a passage to allow various command signals input by the user from the cradle to be transferred to the image display device therethrough. Various command signals or power input from the cradle may operate as signals for recognizing that the image display device is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the image display device 100 may be operated in relation to a web storage device that performs the storage function of the memory 170 over the Internet.

As aforementioned, the controller 180 may typically control the general operations of the image display device 100. For example, the controller 180 may set or release a lock state for restricting a user from inputting a control command with respect to applications when a status of the image display device meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the image display device 100.

The power supply unit 190 may receive external power or internal power and supply appropriate power required for operating respective elements and components included in the image display device 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the image display device 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner.

Here, the terminal body may be understood as a conception which indicates the image display device 100 as at least one assembly.

The image display device 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the image display device 100 may be configured such that one case forms the inner space. In this example, an image display device 100 having a uni-body formed in such a manner that synthetic resin or metal extends from a side surface to a rear surface may also be implemented.

On the other hand, the image display device 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The image display device may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary image display device 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the image display device 100. For example, the display unit 151 may display execution screen information of an application program driven in the image display device 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the image display device 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the image display device 100.

The optical output module 154 may output light for indicating an event generation. Examples of the event generated in the image display device 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the image display device 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the image display device 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the image display device 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the image display device 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the image display device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the image display device 100 may be disposed on the terminal body.

The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the image display device 100 may further be provided on the image display device 100. As one example of the accessory, a cover or pouch for covering or accommodating at least one surface of the image display device 100 may be provided. The cover or pouch may cooperate with the display unit 151 to extend the function of the image display device 100. Another example of the accessory may be a touch pen for assisting or extending a touch input onto a touch screen.

Hereinafter, a communication system which is operable with the image display device 100 according to the present disclosure will be described.

First, such communication system utilizes different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings apply equally to other system types including a CDMA wireless communication system.

A CDMA wireless communication system includes one or more image display devices 100, one or more base stations (BSs), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations.

The base stations may also be denoted as "cell sites." Alternatively, individual sectors of a given base station may be referred to as cell sites.

A broadcasting transmitter (BT) transmits a broadcast signal to the image display devices 100 operating within the system. The broadcast receiving module 111 of FIG. 1A is typically configured inside the image display device 100 to receive broadcast signals transmitted by the BT.

Global Positioning System (GPS) satellites for locating the position of the image display device 100 may cooperate with the CDMA wireless communication system. Such satellites 300 facilitate locating the position of the image display device 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Meanwhile, the present disclosure may display information processed in the image display device using a flexible display. Hereinafter, description thereof will be given in detail with reference to the accompanying drawings.

Figure 2:
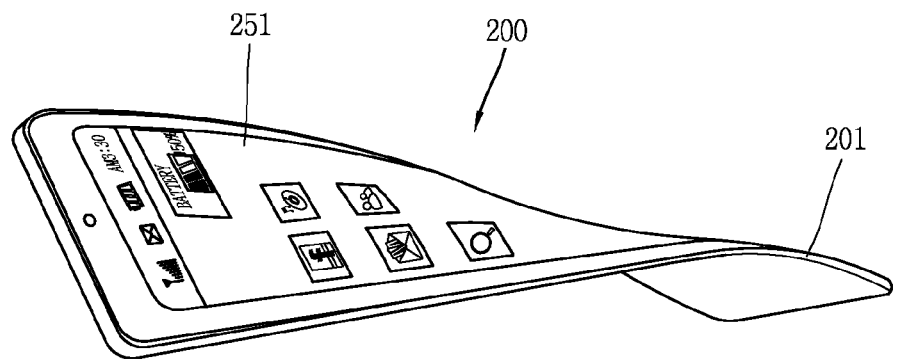
FIG. 2 is a conceptual view for explaining a modified example of a mobile terminal 200 according to the present disclosure.

FIG. 2 is a conceptual view illustrating an exemplary variation of an image display device 200 according to the present disclosure.

As illustrated in FIG. 2, a display unit 251 may be deformable by an external force. The deformation may be at least one of curving, bending, folding, twisting and rolling of the display unit 251. The deformable display unit 251 may be referred to as a 'flexible display unit.' Here, the flexible display unit 251 may include both a general flexible display and an e-paper.

The general flexible display denotes a light, non-fragile display, which still exhibits characteristics of the conventional flat panel display and is fabricated on a flexible substrate which can be curved, bent, folded, twisted or rolled.

Also, the e-paper is a display technology employing the characteristic of a general ink, and is different from the conventional flat panel display in view of using reflected light. The e-paper may change information by using a twist ball or an electrophoresis using a capsule.

In a state that the flexible display unit 251 is not deformed (for example, in a state with an infinite radius of curvature, hereinafter, referred to as a first state), a display region of the flexible display unit 251 may become a flat surface. In a state that the flexible display unit 251 is deformed from the first state by an external force (for example, a state with a finite radius of curvature, hereinafter, referred to as a second state), the display region may become a curved surface (or a bent surface). As illustrated, information displayed in the second state, may be visual information output on the curved surface. The visual information may be realized in such a manner that a light emission of each unit pixel (sub-pixel) arranged in a matrix configuration is controlled independently. The unit pixel denotes an elementary unit for representing one color.

The flexible display unit 251 may be placed in a curved state (for example, a state of being curved from up to down or from right to left), other than a flat state, in the first state. In this case, when an external force is applied to the flexible display unit 251, the flexible display unit 251 may be deformed back into the flat state or into a more curved state.

On the other hand, the flexible display unit 251 may implement a flexible touch screen by a combination with a touch sensor. When a touch is input onto the flexible touch screen, the controller 180 (see FIG. 1A) may execute a control corresponding to the touch input. The flexible touch screen may be configured to sense a touch input even in the second state as well as in the first state.

The image display device 200 according to the exemplary variation may include a deformation sensor which senses the deformation of the flexible display unit 251. The deformation sensor may be included in the sensing unit 140 (see FIG. 1A).

The deformation sensor may be disposed in the flexible display unit 251 or a case 201 to sense information related to the deformation of the flexible display unit 251. Here, the information related to the deformation of the flexible display unit 251 may be a deformed direction, a deformed degree, a deformed position, a deformed time, an acceleration that the deformed flexible display unit 251 is restored, and the like. In addition to those, such information may be various information which is sensible in response to curving of the flexible display unit 251.

Also, the controller 180 may change information displayed on the flexible display unit 251 or generate a control signal for controlling a function of the image display device 200, based on the information related to the deformation of the flexible display unit 251 sensed by the deformation sensor.

The image display device 200 according to the exemplary embodiment may include a case 201 for accommodating the flexible display unit 251. The case 201 may be deformable together with the flexible display unit 251, taking into account the characteristic of the flexible display unit 251.

A battery (not shown) disposed in the image display device 200 may also be deformable together with the flexible display unit 261, taking into account the characteristic of the flexible display unit 251. To implement the battery, a stack and folding method of stacking battery cells may be applied.

On the other hand, an image display device may extend to a wearable device which is wearable on a human body, going beyond usually using the image display device by a user with grabbing it with a hand. Examples of the wearable device may include a smart watch, a smart glass, a head mounted display (HMD), and so on. Hereinafter, description will be given of examples of an image display device extending to the wearable device.

A wearable device may exchange data with (or cooperate with) another image display device 100. The short-range communication module 114 may sense (recognize) a wearable device, which is able to communicate with the image display device), near the image display device 100. In addition, when the sensed wearable device is a device which is authenticated to communicate with the image display device 100 according to the present disclosure, the controller 180 may transmit at least part of data processed in the image display device 100 to the wearable device via the short-range communication module 114. Hence, a user of the wearable device may use the data processed in the image display device 100 on the wearable device. For example, when a call is received in the image display device 100, the user may answer the call using the wearable device. Also, when a message is received in the image display device 100, the user may check the received message using the wearable device.

Figure 3:
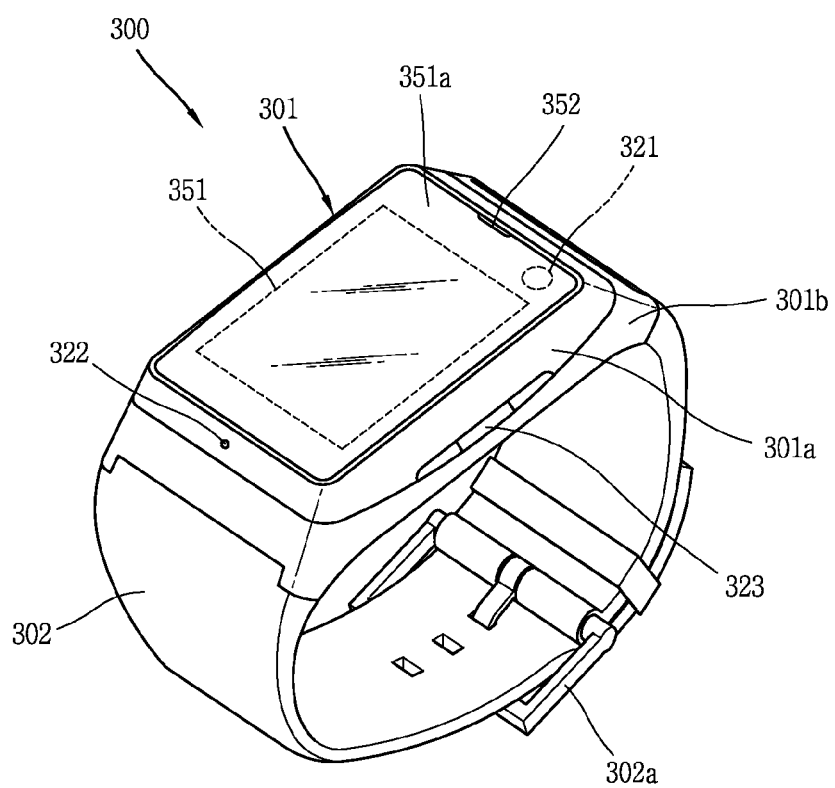
FIG. 3 is a perspective view illustrating an example of a watch type mobile terminal 300 associated with another embodiment of the present disclosure.

FIG. 3 is a perspective view illustrating one example of a watch type image display device 300 in accordance with another exemplary embodiment. As illustrated in FIG. 3, the watch type image display device 300 may include a main body 301 with a display unit 351, and a band 302 connected to the main body 301 to be wearable on a wrist.

The main body 301 may include a case defining an appearance. As illustrated, the case may include a first case 301a and a second case 301b cooperatively defining an inner space for accommodating various electronic components. However, the present disclosure may not be limited to this. One case may be configured to define the inner space, thereby implementing an image display device 300 with a uni-body.

The watch type image display device 300 may be allowed to perform wireless communication, and an antenna for the wireless communication may be installed in the main body 301. The antenna may extend its function using a case. For example, a case including a conductive material may be electrically connected to the antenna so as to extend a ground area or a radiation area.

The display unit 351 may be disposed on a front surface of the main body 301 to output information thereon. The display unit 351 may be provided with a touch sensor so as to implement a touch screen. As illustrated, a window 351a of the display unit 351 may be mounted onto the first case 301a to form a front surface of the terminal body together with the first case 301a.

An audio output module 352, a camera 321, a microphone 322, a user input unit 323 and the like may be disposed on the main body 301. When the display unit 351 is implemented as the touch screen, it may function as the user input unit 323, which may result in excluding a separate key on the main body 301.

The band 302 may be worn on the wrist in a surrounding manner. The band 302 may be made of a flexible material for facilitating the wearing. As one example, the band 302 may be made of fur, rubber, silicon, synthetic resin or the like. The band 302 may also be configured to be detachable from the main body 301. Accordingly, the band 302 may be replaceable with various types of bands according to a user's preference.

On the other hand, the band 302 may be used for extending the performance of the antenna. For example, the band may include therein a ground extending portion (not shown) electrically connected to the antenna to extend a ground area.

The band 302 may be provided with a fastener 302a. The fastener 302a may be implemented into a buckle type, a snap-fit hook structure, a Velcro type, or the like, and include a flexible section or material. The drawing illustrates an example that the fastener 302a is implemented into the buckle type.

On the other hand, in this specification, an image display device as a stationary terminal may include a device for receiving and displaying broadcast data, a device for recording and playing moving images, and a device for recording and reproducing audio data. Hereinafter, a TV will be described as an example of the image display device.

Figure 4:
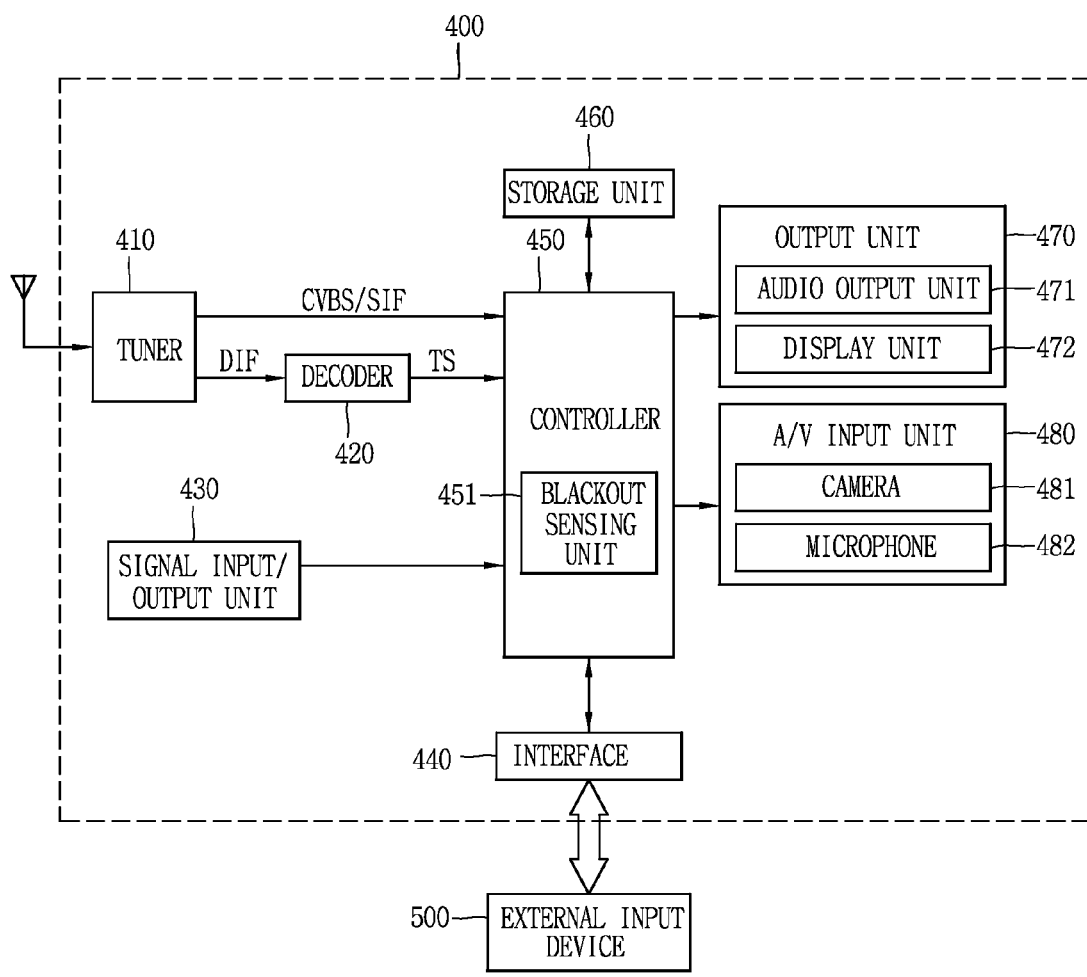
FIG. 4 is a perspective view illustrating an example of a stationary terminal type of image display device 400 associated with another embodiment of the present disclosure.

FIG. 4 is a block diagram illustrating a stationary terminal type image display device 400 and an external input device 500 according to the present disclosure. Referring to FIG. 4, it is a block diagram illustrating a stationary terminal type image display device 400 and an external input device 500. The image display device 400 may include a tuner 410, a decoder 420, a signal input/output unit 430, an interface 440, a controller 450, a storage unit 460, an output unit 470, and an A/V (audio/video) input unit 480. The external input device 500 may be a separate device from the image display device 400, or may be a component of the image display device 400.

Referring to FIG. 4, the tuner 410 may select a radio frequency (RF) broadcast signal, which corresponds to a channel selected by a user, among RF broadcast signals received through an antenna, and convert the selected RF broadcast signal into a medium frequency signal or a baseband image (video)/audio signal. For example, when the RF broadcast signal is a digital broadcast signal, the tuner 410 may convert the RF broadcast signal into a digital IF signal (DIF). On the other hand, when the RF broadcast signal is an analog broadcast signal, the tuner 410 may convert the RF broadcast signal into an analog baseband video/audio signal (CVBS/SIF). The tuner 410 may thus be a hybrid tuner which is capable of processing the digital broadcast signal and the analog broadcast signal.

The digital IF signal (DIF) output from the tuner 410 may be input into the decoder 420, while the analog baseband video/audio signal (CVBS/SIF) output from the tuner 410 may be input into the controller 450. The tuner 410 may receive a signal carrier RF broadcast signal according to an advanced television systems committee (ATSC) standard or a multi-carrier RF broadcast signal according to a digital video broadcasting (DVB) standard.

Although the drawing illustrates one tuner 410, the present disclosure may not be limited to this. The image display device 400 may include a plurality of tuners, for example, first and second tuners. In this case, the first tuner may receive a first RF broadcast signal corresponding to a broadcasting channel selected by a user, and the second tuner may receive a second RF broadcast signal corresponding to a pre-stored broadcasting channel in a sequential or periodical manner. Similar to the first tuner, the second tuber may convert an RF broadcast signal into a digital IF signal (DIF) or an analog baseband video or audio signal (CVBS/SIF).

The decoder 420 may receive the digital IF signal (DIF) converted by the tuner 410 and decode the received signal. For example, when the DIF output from the tuner 410 is a signal according to the ATSC standard, the decoder 420 may perform 8-vestigal side band (8-VSB) demodulation. Here, the decoder 420 may also perform channel decoding, such as trellis decoding, de-interleaving, reed Solomon decoding and the like. To this end, the decoder 420 may include a trellis decoder, de-interleaver, a reed Solomon decoder and the like.

As another example, when the digital IF signal (DIF) output from the tuner 410 is a signal according to the DVB standard, the decoder 420 may perform a coded orthogonal frequency division modulation (COFDMA) demodulation. Here, the decoder 420 may also perform convolution decoding, de-interleaving, reed Solomon decoding and the like. To this end, the decoder 420 may include a convolution decoder, a de-interleaver, a reed Solomon decoder and the like.

The signal input/output unit 430 may perform signal input and output operations by being connected to an external device. To this end, the signal input/output unit 130 may include an A/V input/output unit (not shown) and a wireless communication unit (not shown).

The A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, a liquid HD terminal and the like. Digital signals input through those terminals may be forwarded to the controller 450. Here, analog signals input through the CVBS terminal and the S-video terminal may be forwarded to the controller after being converted into digital signals through an analog-digital converter (not shown).

The wireless communication unit may execute wireless Internet access. For example, the wireless communication unit may execute the wireless Internet access using wireless LAN (WLAN) (Wi-Fi), wireless broadband (Wibro), world interoperability for microwave access (Wimax), high speed downlink packet access (HSDPA) and the like. The wireless communication unit may also perform short-range wireless communication with other electronic devices. For example, the wireless communication unit may perform the short-range wireless communication using Bluetooth, radio frequency identification (RFID), infrared data association (IrDA), ultra wideband (UWB), Zigbee and the like.

The signal input/output unit 430 may transfer to the controller 450 a video signal, an audio signal and a data signal, which are provided from external devices, such as a digital versatile disk (DVD) player, a blu-ray player, a game player, a camcorder, a computer (notebook computer), a portable device, a smart phone and the like. Also, the signal input/output unit 430 may transfer to the controller 450 a video signal, an audio signal and a data signal of various media files, which are stored in an external storage device, such as a memory, a hard disk and the like. In addition, the signal input/output unit 430 may output a video signal, an audio signal and a data signal processed by the controller 450 to other external devices.

The signal input/output unit 430 may perform signal input and output operations by being connected to a set-top box, for example, an Internet protocol TV (IPTV) set-top box via at least one of those various terminals. For instance, the signal input/output unit 430 may transfer to the controller 450 a video signal, an audio signal and a data signal, which has been processed by the IPTV set-top box to enable bidirectional communication, and also transfer signals processed by the controller 150 to the IPTV set-top box. Here, the IPTV may include ADSL-TV, VDSL-TV, FTTH-TV and the like which are divided according to a transmission network.

Digital signals output from the decoder 420 and the signal input/output unit 430 may include a stream signal (TS). The stream signal (TS) may be a signal in which a video signal, an audio signal and a data signal are multiplexed. For example, the stream signal (TS) may be an MPEG-2 transport stream (TS) signal obtained by multiplexing an MPEG-2 video signal and a Dolby AC-3 audio signal. An MPEG-2 TS signal may include a 4-byte header and a 184-byte payload.

The interface 440 may receive an input signal for power control, channel selection, screen setting or the like from an external input device 500 or transmit a signal processed by the controller 450 to the external input device 500. The interface 440 and the external input device 500 may be connected to each other in a wired or wireless manner.

As an example of the interface unit 440, a sensor may be provided. The sensor may be implemented as a remote controller to sense the input signal.

A network interface unit (not shown) provides an interface for connecting the image display device 400 with a wired/wireless network including an internet network. The network interface unit 530 may be provided with an Ethernet terminal, etc. for connection with a wired network. For connection with a wireless network, WLAN (Wireless LAN) (Wi-Fi), Wibro (Wireless broadband), Wimax (World Interoperability for Microwave Access), HSDPA (high speed downlink packet access), etc. may be used.

The network interface unit (not shown) may access to a prescribed web page through a network. That is, the network interface unit may transceive (transmit and receive) data with a corresponding server. The network interface unit may receive content or data provided from a content provider or a network operator. That is, the network interface unit may receive contents such as movies, advertisements, games, VOD, and broadcast signals provided from a content provider or a network provider through a network, and information related thereto. The network interface unit may receive update information and update files provided from a network operator. The network interface unit may transmit data to an Internet provider, a content provider or a network operator.

The network interface unit (not shown) may select and receive a desired application among applications open to the public, through a network.

The controller 450 may control an overall operation of the display device 400. More specifically, the controller 450 may control generation and output of images. For example, the controller 450 may control the tuner 410 to tune an RF broadcast signal corresponding to a user-selected channel or a pre-stored channel. Although not shown, the controller 450 may include a demultiplexer, a video processor, an audio processor, a data processor, an On screen display (OSD) generator and the like. The controller 450 may include a CPU, a peripheral device, etc. by hardware.

The controller 450 may demultiplex a stream signal (TS), e.g., an MPEG-2 TS signal into a video signal, an audio signal and a data signal.

The controller 450 performs image processing, for example, decoding, on an inversely-multiplexed image signal. More specifically, the controller 450 decodes an MPEG-2 standard-encoded image signal by using an MPEG-2 decoder, and decodes an H.264 standard-encoded image signal according to digital multimedia broadcasting (DMB) standard or digital video broadcast-handheld (DVB-H) standards by using an H.264 decoder. In addition, the controller 450 may perform the imaging processing in such a manner that brightness, tint and color of the image signal are adjusted. The image signal, which is image-processed by the controller 450, may be transferred to the display unit 472 or transferred to an external output device (not shown) through an external output port.

The controller 450 may perform, voice processing, for example, decoding, on an inversely multiplexed voice signal. More specifically, the controller 450 decodes an MPEG-2 standard-encoded voice signal by using an MPEG-2 decoder, decodes an MPEG 4 bit sliced arithmetic coding (BSAC) standard-encoded voice signal according to the DMB standards by using an MPEG 4 decoder, and decodes an MPEG 2 advanced audio coded (AAC) standard-encoded voice signal according to satellite DMB standards or the digital video broadcast-handheld (DVB-H) standards by using an AAC decoder. In addition, the controller 450 may perform base processing, treble processing, and sound volume processing. The voice signal that is processed by the controller 450 in this manner may be transferred to an audio output unit 471, e.g., a speaker, or may be transferred to an external out device.

The controller 450 may process an analog baseband video/audio signal (CVBS/SIF). Here, the analog baseband video/audio signal (CVBS/SIF) input to the controller 450 may be an analog baseband video/audio signal output from the tuner 410 or the signal input/output unit 430. The processed video signal is displayed on the display unit 472, and the processed audio signal is output through the audio output unit 471.

The controller 450 may process, for example, decode a demultiplexed data signal. Here, the data signal may include electronic program guide (EPG) information, which may include broadcast information, such as start time, end time and the like, related to a broadcast program broadcasted on each channel. The EPG information may include ATSC-program and system information protocol (ATSC-PSIP) information and DVB-service information (DVB-SI) information. The ATSC-PSIP information or DVB-SI information may be included in an MPEG-4 TS header (4 bytes).

The controller 450 may perform on-screen display (OSD) processing. In more detail, the controller 450 may generate an OSD signal for displaying various information as graphic or text data based on at least one of a video signal and a data signal or an input signal received from the external input device 500. The OSD signal may include various data such as a user-interface (UI) screen for the image display device 400 and various menu screens, widgets, icons and the like.

The storage unit 460 may store various programs for signal processing and control by the controller 450, and may also store processed video, audio and data signals. The storage unit 460 may include at least one of a flash memory-type storage medium, a hard disc-type storage medium, a multimedia card micro-type storage medium, a card-type memory (for example, SD or XD memory), a random access memory (RAM), a read-only memory (ROM), electrically erasable programmable ROM (EEPROM), a magnetic memory, a magnetic disk and an optical disk.

The output unit 470 is configured to generate output of data in a visible manner, in an audible manner, etc. The output unit 470 includes the audio output unit 471 and the display unit 472.

The audio output unit 471 outputs a voice signal processed by the controller 450, e.g., a stereo signal or a 5.1-channel signal. The audio output unit 1471 may be implemented in various types of speakers.

The display unit 472 may convert a processed video signal, a processed data signal, and an OSD signal provided by the controller 450 into RGB signals, thereby generating driving signals. Under such configuration, the display unit 472 outputs images. The display unit 472 may be implemented into various types of displays such as a plasma display panel, a liquid crystal display (LCD), a thin film transistor-LCD (TFT-LCD), an organic light-emitting diode (OLED), a flexible display, a three-dimensional (3D) display, an e-ink display and the like. The display unit 471 may also be implemented as a touch screen and may thus be used as an input device.

The A/V input unit 480 is configured to receive an audio or video signal, and may include a camera 481, a microphone 482, etc. The camera 481 processes image frames such as still images or moving images acquired by an image sensor in a video capturing mode or an image capturing mode. The processed image frames may be displayed on the display unit 472.

The image frames processed by the camera 481 may be stored in the memory 460 or transmitted via a radio communication unit (not shown). Two or more cameras 481 may be provided according to a user environment.

The camera 481 may capture a user. The camera 481 may be implemented as a single camera. However, the camera 481 may be implemented as a plurality of cameras. Information on images captured by the camera 481 is input to the controller 450.

For sensing of a user's gesture, a sensing unit (not shown), having at least one of a touch sensor, a sound sensor, a position sensor and an operation sensor, may be further provided at the image display device 400. A signal sensed by the sensing unit (not shown) may be transferred to the controller 450 through the interface unit 440.

The controller 450 may sense a user's gesture based on images captured by the camera 481, or based on signals sensed by the sensing unit (not shown), or by combination of them.

The microphone 482 receives sounds (audible data) via a microphone in a phone call mode, a recording mode, a voice recognition mode, and the like, and processes such sounds into electric voice data. The microphone 482 may implement various types of noise canceling (or suppression) algorithms to cancel (or suppress) noise or interference generated in the course of receiving and transmitting audio signals.

Referring to FIG. 4 again, a power supply unit (not illustrated) supplies electric power to the image display device 400. Specifically, the power supply unit supplies electric power the controller 450 that is realized in the form of a system-on chip (SOC), the display unit 472 for displaying an image, and the audio output unit 471 for outputting audio.

To do this, the power supply unit (not illustrated) may include a converter (not illustrated) that converts DC power into AC power. For example, if the display unit 472 is realized as a liquid crystal panel including multiple backlight lamps, the power supply unit may further include an inverter (not illustrated) in which a PWM operation is possible for brightness variability and dimming drive.

In addition, the power supply unit (not shown) may include a battery (or cell) for converting energy calculated using a chemical or physical reaction into electrical energy. The power supply unit may charge a battery while power is supplied from the outside. Furthermore, when power is not supplied from the outside, the power supply unit may supply power to the image display device 400 using energy stored in the battery. For example, when a plug of the image display device 400 is removed from the outlet or electricity supplied to houses is temporarily disconnected, the power supply unit may operate the image display device 400 using power stored in the battery.

The battery may be configured to be integrated into the body of the image display device 400 or directly detachable from the outside of the body.

On the other hand, the image display device 400 according to an embodiment of the present disclosure may further include a blackout sensing unit 451 for sensing whether or not there occurs a blackout. The blackout sensing unit 451 may sense whether or not electricity supplied from the outside is disconnected using a signal generated from the power supply unit (not shown). For example, the blackout sensing unit 451 may determine whether power is turned off due to a user input, the plug is removed from the outlet or there occurs a blackout.

The external input device 500 is connected to the interface unit 440 by a cable or wirelessly, and transmits an input signal that is generated according to a user input, to the interface unit 440. The external input device 500 may include a remote controller, a mouse, a keyboard, and the like. The remote controller transmits an input signal to the interface unit 440 by using Bluetooth communication, RF communication, IR communication, ultra wideband (UWB) communication, ZigBee communication, or the like. The remote controller may be implemented as a spatial remote controller. The spatial remote controller may generate an input signal by detecting a movement of a main body.

The image display device 400 may be realized as a fixed type digital broadcast receiver for receiving at least one of an ATSC type (8-VSB type) digital broadcast, a digital broadcast, a DVB-T type (COFDM type) digital broadcast, and an ISDB-T type (BST-OFDM type) digital broadcast. Alternatively, the image display device 400 may be realized as a mobile type digital broadcast receiver for receiving at least one of a ground wave DMB type digital broadcast, a satellite DMB type digital broadcast, an ATSC-M/H type digital broadcast, a DVB-H type (COFEM type) digital broadcast, and a media forward link-only type digital broadcast. Alternatively, the image display device 400 may be implemented as a digital broadcast receiver for cable communication, satellite communication or IPTV.

Figure 5:
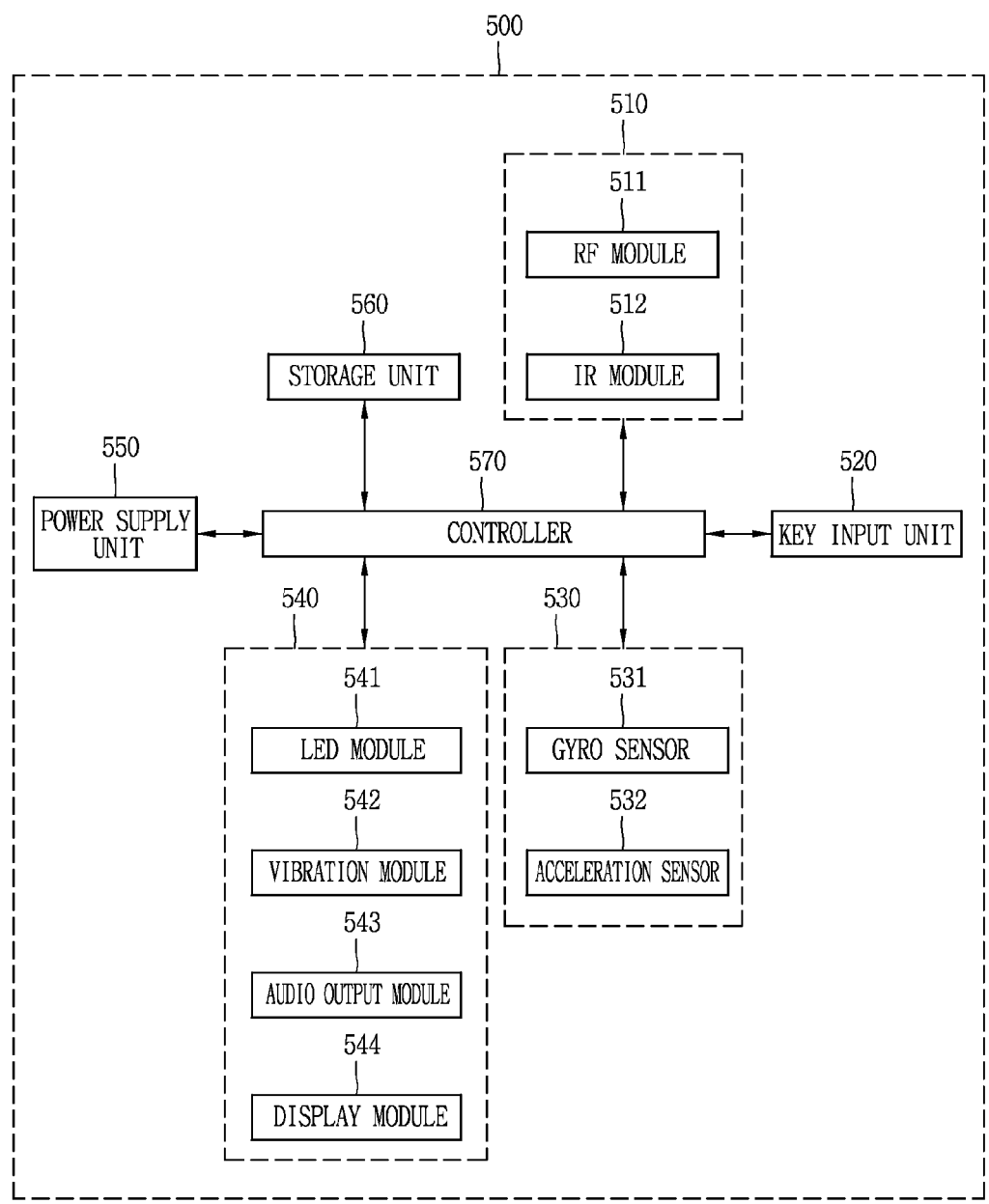
FIG. 5 is a block diagram specifically illustrating an external input device 500 in FIG. 2.

FIG. 5 is a block diagram illustrating the external input device 500 of FIG. 5 in detail. The external input device 500 includes a wireless communication unit 510, a user input unit 520, a sensing unit 530, an output unit 540, a power supply unit 550, a storage unit 560 and a controller 570.

Referring to FIG. 5, the wireless communication unit 510 may transmit a signal to the image display device 400 or receive a signal from the image display device 400. To this end, the wireless communication unit 510 may include an RF module 511 and an IR module 512. The RF module 511 may transmit and receive signals according to an RF communication standard by being connected to the interface 440 of the image display device 400. The IF module 512 may transmit and receive signals according to an IF communication standard by being connected to the interface 440 of the image display device 400.

The user input unit 520 may include as an input element a keypad, a key button, a scroll key, a jog key and the like. The user may manipulate the user input unit 520 to input (enter) commands (instructions) related to the image display device 400. The command, for example, may be entered as a user pushes a hard key button of the user input unit 500.

The sensing unit 530 may include a gyro sensor 531 and an acceleration sensor 532. The gyro sensor 531 may sense a spatial movement of the external input device 500 based on X, Y and Z axes. The acceleration sensor 532 may sense a moving speed of the external input device 500 and the like.

The output unit 540 may output information in response to manipulation of the user input unit 530 and information corresponding to a signal sent by the image display device 400. Therefore, a user may recognize a manipulation state of the user input unit 530 or a control state of the image display device 400 through the output unit 530. For example, the output unit 540 may include an LED module 541 which is turned on and off, a vibration module 542 which generates vibration, an audio output module 543 which outputs sound, and a display module 544 which outputs images, in response to manipulation of the user input unit 530 or transmission and reception of signals through the wireless communication unit 210.

The power supply unit 550 may supply power to various electronic elements of the external input device 500. The power supply of the power supply unit 550 may be stopped when the external input device 500 does not move for a predetermined time, thereby reducing power consumption. The power supply unit 550 may resupply power when a predetermined key of the external input device 500 is manipulated.

The storage unit 560 may store various programs, which are involved with control and operations of the external input device 500, applications, frequency band information and the like. The controller 570 may execute an overall control operation of the external input device 500.

The external input device 500 may transmit to or receive from the image display device 400 according to the RF character standard. A control menu may be displayed according to a control signal of the external input device 500 on the screen of the image display device 400. The external input device 500 may be provided with a plurality of buttons to generate an external input signal according to the user's button manipulation.

Hereinafter, operations implemented in an image display device having at least one of the foregoing constituent elements will be described in more detail with reference to the accompanying drawings. However, for the sake of convenience of explanation, a terminal illustrated in FIG. 1 is described as an example, but the present disclosure may not be necessarily limited to this. In other words, the present disclosure may be also applicable to a wearable device such as a watch or glasses capable of displaying an image as well as a mobile terminal or stationary terminal.

An image display device according to the present disclosure may execute a specific character playback mode. Here, the specific character playback mode denotes a mode in which a specific section containing at least one character other than the entire playback section of video is selectively played back. More specifically, the controller searches a partial playback section containing a specific character from the entire playback section of video, and extracts a major playback section based on a preset criteria from the retrieved partial playback section. Then, the controller may play the extracted major playback section or display a progress bar associated with the extracted major playback section on the display unit.

Hereinafter, a flow of a method of selecting a specific character to extract a major playback section while executing a specific character playback, and controlling a function associated with the extracted major playback section will be described.

Figure 6:
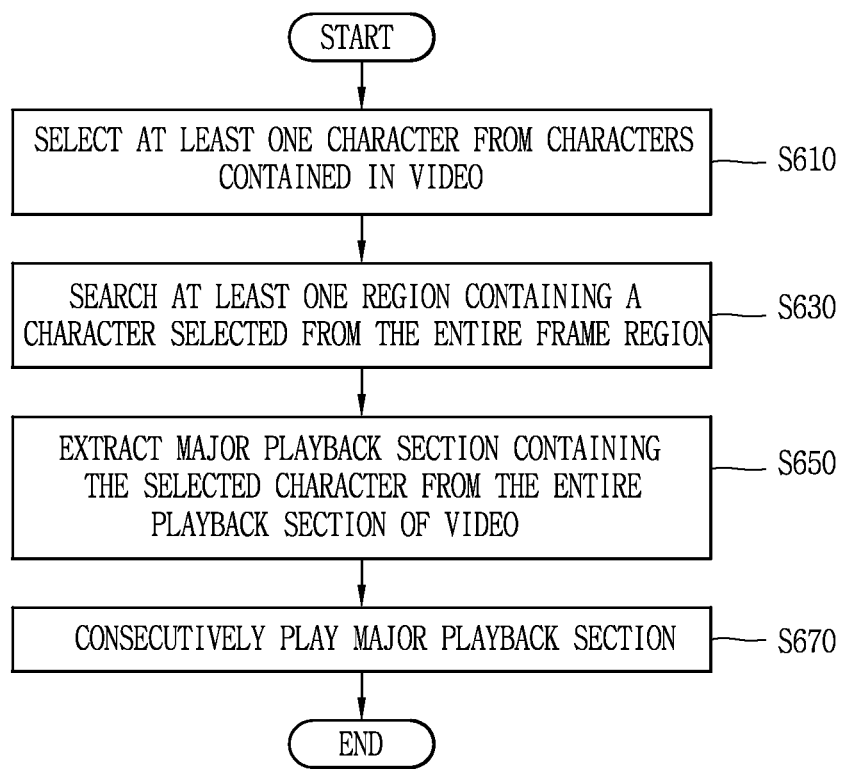
FIG. 6 is a flow chart representatively illustrating a control method of the present disclosure.
Figure 7A:
FIGS. 7A, 7B and 7C are views for specifically explaining a method of extracting a major playback section in the control method of FIG. 6.
Figure 7B:
Figure 7C:
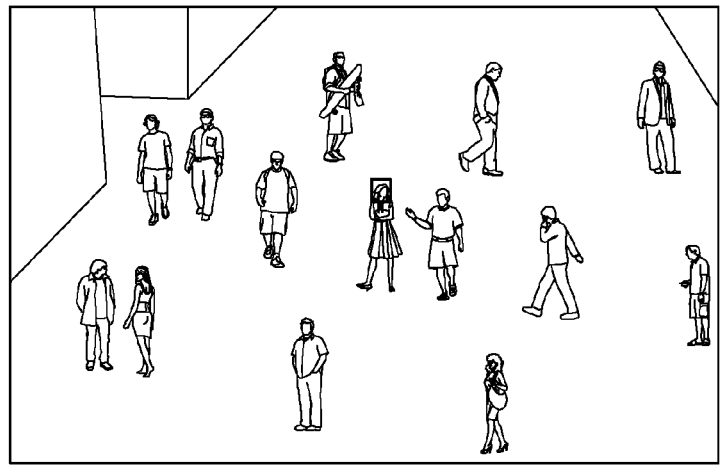

FIG. 6 is a flow chart representatively illustrating a control method of the present disclosure, and FIGS. 7A, 7B and 7C are views for specifically explaining a method of extracting a major playback section in the control method of FIG. 6.

First, when the specific character playback mode is carried out, the controller 180 selects at least one of characters contained in video (S610).

Here, video denotes a content stored in an external device such as a server or the like, and a moving image content for which a total playback time is determined. The controller 180 selects at least one video, and selects at least one of characters shown in the selected video.

At this time, the controller 180 may automatically select at least one character according to a preset criteria or select it based on a user input.

The preset criteria may be set to a figure having the longest total appearance time on the entire playback section of video, for example. For another example, the preset criteria may be set to a figure corresponding to the main character of video. When metadata capable of specifying the main character is included in video, the controller 180 may select at least one character using the metadata.

Furthermore, the controller 180 may select at least one character based on a user input. For example, the controller 180 may generate a list of characters shown in video using a biometric technology or using metadata included in video. Furthermore, the controller 180 may allow the user to select at least one character in a state that the generated list of characters is displayed on the display unit. For another example, the controller 180 may allow the user to enter a character name to select at least one character. For still another example, the controller 180 may allow the user to select at least one of characters included in the screen. A method of selecting a character based on a user input will be described below in detail with reference to FIG. 8.

On the other hand, when at least one character is selected, the controller 180 searches at least one region containing the selected character from the entire region of a frame (S630). Here, the "selected character" denotes at least one character selected according to a preset criteria or according to a user input.

The controller 180 scans the entire playback section of video to search sections containing the selected character. More specifically, the controller 180 searches sections in which the selected character is consecutively shown for more than a reference period of time.

The retrieved sections may include a plurality of frames spaced apart in time, respectively. Furthermore, the retrieved sections may correspond to different playback time points on the entire playback section of video, and may have different total playback times. For example, the retrieved sections may include a first section including frames from a first playback time point to a second playback time point and a second section including frames from a third playback time point to a fourth playback time point.

On the other hand, the controller 180 searches at least one region including the selected character from the entire region of a frame using at least one frame of the frames. For example, when ten frames are provided in video, and the selected character is contained in the first and the second frame, the controller 180 searches at least one region containing a character selected from the first and the second frame.

At this time, the controller 180 searches a region containing the selected character using a biometric technology. For example, the biometric technology may include iris recognition and face recognition. Hereinafter, for the sake of convenience of explanation, the present disclosure will be described using an example of searching a face region containing eyes, a nose and a mouth using a face recognition function. The technology of searching a face region from an image is a publicly known technology, and thus the detailed description thereof will be omitted.

When a face region is retrieved from a frame of a specific playback time point, the controller 180 may build a database for frame information for the frame and region information on the size and location of the retrieved face region.

On the other hand, the controller 180 may retrieve a region containing a character in the unit of section other than in the unit of frame for fast computation. In this case, the controller 180 extracts an appearance section in which the selected character is shown during the entire playback section of video. More specifically, the controller 180 extracts a section connected to a time at which the selected character is shown for an interval less than a threshold as an appearance section. Then, the controller 180 calculates an average size and an average location of a region containing the selected character for each appearance section using frames included in the extracted appearance section. The region information and section information on the calculated average size and average location may be built as a database.

Next, a major playback section containing the selected character is extracted from the entire playback section of video (S650).

The controller 180 extracts a major playback section based on a preset criteria. More specifically, the controller 180 adds a frame satisfying a preset criteria to the major playback section and removes a frame that does not satisfy a preset criteria from the major playback section. In other words, the controller 180 extracts some frames satisfying a preset condition among frames included in the entire playback section of video, and generates a major playback section using the extracted frames. As a result, the major playback section may include a plurality of sections spaced apart in time on the entire playback section of video.

On the other hand, the preset condition is associated with at least one of the size and location of a region containing the selected character within the entire region of a frame. For example, when the size of a region containing the selected character is greater than a reference size, the relevant frame can be added to the major playback section. For another example, when a plurality of characters are contained in one frame, and the size of a region containing the selected character is less than by a predetermined ratio than a region containing another character, the relevant frame may be removed from the major playback section.

The controller 180 may extract a major playback section based on a feature such as an absolute size of a region containing the selected character, a location (or a distance from the center of a frame) at which the selected character is displayed, a size change amount of a region containing the selected character (for example, when the size of a region on a second frame is changed by more than a reference value than a first frame in consecutive first and second frames), and an appearance time of the selected character. In addition, the controller 180 may extract a major playback section based on a feature such as a number of characters contained in a frame, a relative size of the selected character compared to the other characters, a location at which the other characters are displayed, and an appearance time of the other characters.

The controller 180 may extract a major playback section using the size and location of a region containing the selected character as well as the voice of the selected character in a collective manner. For example, the selected character may be contained in a region having a larger size than a reference value on a frame, but the voice of the selected character may not be recognized on audio at the same playback time point. In this case, the relevant frame may be removed from the major playback section. On the contrary, though the selected character is not contained in a frame, the voice of the selected character may be solely recognized on audio at the same playback time point. In other words, when only the voice of the selected character is recognized, the relevant frame may be added to the major playback section.

On the other hand, the controller 180 may extract one major playback section or extract a plurality of major playback sections. The controller 180 may calculate a figure significance based on at least one of the size and location of a character contained in a frame for each frame.

The figure significance may be given step by step from a first step in the order from high significance to low significance.

For example, a figure significance may be given based on the location and size of a character contained in a frame. More specifically, a first condition corresponding to a first figure significance, a second condition corresponding to a second figure significance, and the like are stored in the memory, and the controller 180 may determine a figure significance of the character based on a condition stored in the memory. In other words, the first figure significance is given when the location and size of a character satisfies the first condition, and, the second figure significance is given when the location and size of a character satisfies the second condition.

For another example, the figure significance may be given based on the number of characters contained in a frame, and the location and size of each character. More specifically, when only a first character is contained in the frame, a first figure significance is given to the first character. Furthermore, when a first and a second character are contained in the frame, and the first character is larger than the second character and located closer to the center of the frame, a first figure significance may be given to the first character and a second figure significance to the second character.

Referring to FIG. 7, nine video frames containing the selected character are shown as an example associated with the present disclosure. The controller 180 may search a region containing the selected character using a face recognition technology and specify the retrieved region. For example, a region containing the selected character may be specified with a rectangle or a specific region may be highlighted to be distinguished from the other region while displaying the frame on the display unit. Hereinafter, the region containing the selected character is referred to as a "retrieved region".

The controller 180 may provide a figure significance of the selected character on a frame associated with the retrieved region based on at least one of the location and size of the retrieved region. For example, when the retrieved region satisfies a first condition on such frames illustrated in FIG. 7A, a first figure significance corresponding to the first condition may be given to the frames. On the contrary, when the retrieved region satisfies a second condition on such frames illustrated in FIG. 7B, a second figure significance corresponding to the second condition may be given to the frames. Meanwhile, when the selected character is retrieved but the retrieved region does not satisfy both the first and the second condition on such frames illustrated in FIG. 7C, a third figure significance corresponding to the third condition may be given to the frames. Conditions for providing a figure significance may be set in various ways according to the embodiments.

Subsequently, the controller 180 may extract a different major playback section based on a figure significance provided to the frame. For example, a first major playback section may be configured with a frame having a first figure significance, and a second major playback section may be configured with a frame having a first and a second figure significance. In the same manner, a third major playback section may be configured with a frame having a first through a third figure significance. In other words, the third major playback section may include all frames containing the selected character. Any one of the first through third major playback section may be selectively played based on a user input.

As described above, the figure significance may be used to indicate a relation with the character or a feature of the character in video as well as used to extract a different major playback section. For example, when a progress bar indicating a playback progress state of video is displayed on the display unit, a figure significance of the selected character may be displayed adjacent to the progress bar. More specifically, the progress bar may perform the role of x-axis using time as a variable to display a graph using a figure significance as a variable adjacent to the progress bar.

Furthermore, an image reflecting a figure significance of one position may be displayed at a location adjacent to the one position of the progress bar. Different images may be displayed at different positions of the progress bar. In other words, a different image may be displayed according to the location of one position. More specifically, since a frame varies according to the location of a playback time point, and the size and location of a region in which the selected character is retrieved. Accordingly, the figure significance of the selected character may vary according to the playback time point of video. The controller 180 may display a different image based on a figure significance calculated at one position. Here, a different image denotes an image having a different shape, length, size, color or the like. An embodiment of indicating the feature of a character using a figure significance will be described in more detail with reference to FIG. 11.

Next, the process of consecutively a major playback section is carried out (S670).

The major playback section may include a plurality of sections spaced apart in time on the entire playback section of video. When a major playback section is played back, the controller 180 consecutively plays frames included in the plurality of sections. In other words, only a frame included in the major playback section is played back. As a result, the user may selectively view a major playback section extracted as a major scene by the controller 180.

On the other hand, while playing the major playback section, the controller 180 may display at least one of a main progress bar corresponding to the entire playback section of video and a sub progress bar corresponding to the major playback section on the display unit. When a plurality of major playback sections are extracted, the sub progress bar may include a plurality of sub progress bars corresponding to the major playback sections, respectively. Hereinafter, the "progress bar" is used to have a meaning including a main progress bar and a sub progress bar.

On the other hand, the controller 180 may change a progress bar displayed on the display unit based on a user input applied to the progress bar. For example, when a long touch to a first progress bar is sensed in a state that the first progress bar is displayed, the controller 180 may display the first and the second progress bar. For another example, when a flicking input consecutively moved from a first position to a second position in a state that the first progress bar is displayed, the second progress bar may be displayed instead of the first progress bar. Furthermore, when a drag input for moving down any one progress bar is sensed in a state that a plurality of progress bars are displayed, the controller 180 may select the any one progress bar and another progress bar, and change the display location of the any one and another progress bar.

A playback subject may vary as any one progress bar is selected by a user input. Here, the playback subject may include the entire playback section of video and a major playback section extracted by the controller 180, and a plurality of major playback sections may be extracted.

The controller 180 may play any one playback subject corresponding to the selected progress bar in response to any one progress bar being selected. For example, the entire playback section is consecutively played back when a main progress bar is selected, and a major playback section corresponding to the selected any one progress bar is consecutively played back when any one of sub progress bars is selected. In other words, the controller 180 selects any one progress bar based on a user input, and plays a playback subject corresponding to the selected progress bar.

On the other hand, a major playback section may be played back in a state that a main progress bar is displayed or selected. In this case, sections included in the major playback section is highlighted to be distinguished from the other sections (or sections that are not contained in the major playback section). Since only a highlighted portion on the entire section of the main progress bar is played back, a user may recognize that the major playback section is being played back.

In addition, when a progress bar is displayed, the controller 180 may display an image associated with a figure significance at a location adjacent to the progress bar. The image may be an image indicating a character, and for example, a photo (or thumbnail image) representing a character. Furthermore, information associated with a character (for example, detailed information on an actor or actress such as his or her name, detailed information on a character such as a name of the character, etc.) may be displayed on the image.

Subsequently, the controller 180 may display a different image according to a playback position while displaying a progress bar. Here, the different image may denote an image having a different shape, length, size, color or the like.

The different image may be associated with a figure significance of the selected character calculated from a plurality of sections spaced apart in time. More specifically, the controller 180 may calculate a figure significance of the selected character from a plurality of sections, respectively, and display a different sized image based on the calculated figure significance.

For example, when the figure significance of the selected character is a first level during the first section of the plurality of sections, and a second level during the second section, the controller 180 may display an image having a first size at a location corresponding to the first section, and display an image having a second size which is different from the first size at a location corresponding to the second section. In other words, they are the same image, but may be displayed with images having different sizes according to the figure significance.

Furthermore, when a different character is shown along with the selected character during the first section, the controller 180 may calculate a figure significance of the different character, and display an image associated with the different character. For example, when a figure significance of the selected character is a first level and a figure significance of the different character is a second level during a specific section, the controller 180 may display a first image corresponding to the first character with a first size at a location corresponding to the specific section, and display a second image corresponding to the second character with a second size which is different from the first size.

As described above, the figure significance of the selected character may be displayed in a graph or image along with a progress bar on the display unit. Accordingly, the user may easily know a significance of the selected character at each playback time point of video. In other words, the user may easily know which figure is a major character at each time point of video. Furthermore, the controller 180 may check a relation between the selected character and another character using a different image displayed around the progress bar.

On the other hand, a plurality of progress bars may be displayed on the display unit. The plurality of progress bars correspond to different playback times. For example, a main progress bar corresponds to a total playback time of the entire playback section of video, and a sub progress bar corresponds to a total playback time of the major playback section.

A plurality of progress bars may include different marks for guiding each playback position. The plurality of progress bars may have different total playback times, and thus a different mark may be displayed at a different location according to the total playback time of the progress bar. For example, when video is played back in a state that the total playback time of the first progress bar is 3 minutes, and the total playback time of the second progress bar is 2 minutes, a first mark may be displayed at a position corresponding to one minute on the first progress bar, and a second mark may be displayed at a position corresponding to one minute and 30 seconds on the second progress bar.

On the other hand, when a user input for moving the second mark to one position of the second progress bar is sensed while playing a major playback section, the controller 180 displays a frame of the playback position corresponding to the moved position on the display unit. At this time, the controller 180 moves the first mark to a location corresponding to the playback position on the first progress bar.

On the contrary, when a user input for moving the first mark to one location of the first progress bar is sensed, the controller 180 displays a frame of the playback position corresponding to the moved location. The controller 180 controls the second progress bar not to be displayed when the frame of the playback position is not contained in the major playback section, and moves the second mark to a location corresponding to the playback position on the second progress bar when the frame of the playback position is contained in the major playback section.

On the other hand, when a long touch to the sub progress bar is sensed in a state that the main progress bar and the sub progress bar are displayed at the same time, the controller 180 controls the sub progress bar to be movable. In other words, when a touch starts its movement subsequent to a long touch, the controller 180 moves the display location of the sub progress bar according to the movement of the touch. As a result, the user may locate the sub progress bar at his or her desired location.

In this manner, in a specific character playback mode, a major playback section may be extracted and played back according to at least one of the size and location of a region containing the selected character. Furthermore, it may be possible to display at least one of a sub progress bar corresponding to the major playback section as well as a main progress bar corresponding to the entire playback section. As a result, the terminal may play video in a new form.

The foregoing control method associated with the present disclosure may be embodied in various forms as illustrated in FIGS. 8 through 16. Hereinafter, according to a specific embodiment which will be described below, the same or similar reference numerals are designated to the same or similar configurations to the foregoing examples, and the description thereof will be substituted by the earlier description.

FIG. 8 is a conceptual view illustrating a method of selecting a specific character as an example of an operation implemented by the control method of FIG. 6.

Figure 8A:
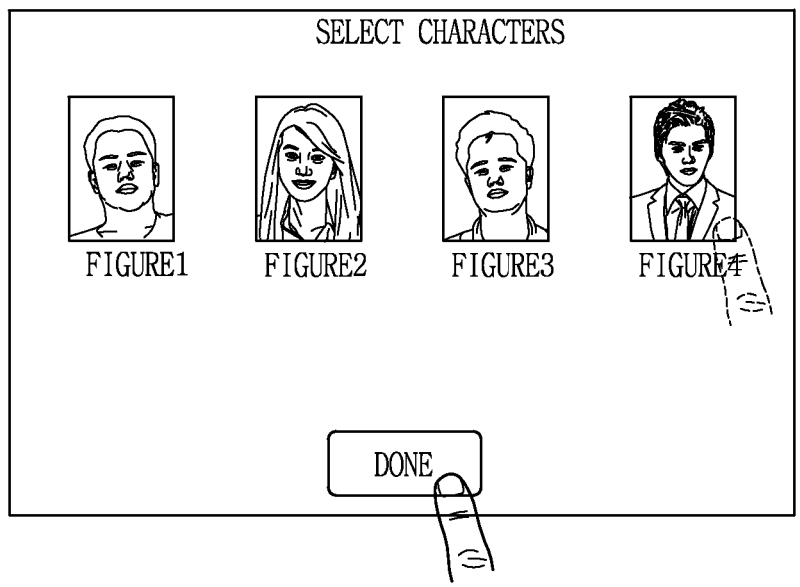
FIGS. 8A, 8B, 8C, 8D and 8E are conceptual views illustrating a method of selecting a specific character as an example of an operation implemented by the control method of FIG. 6.
Figure 8A:
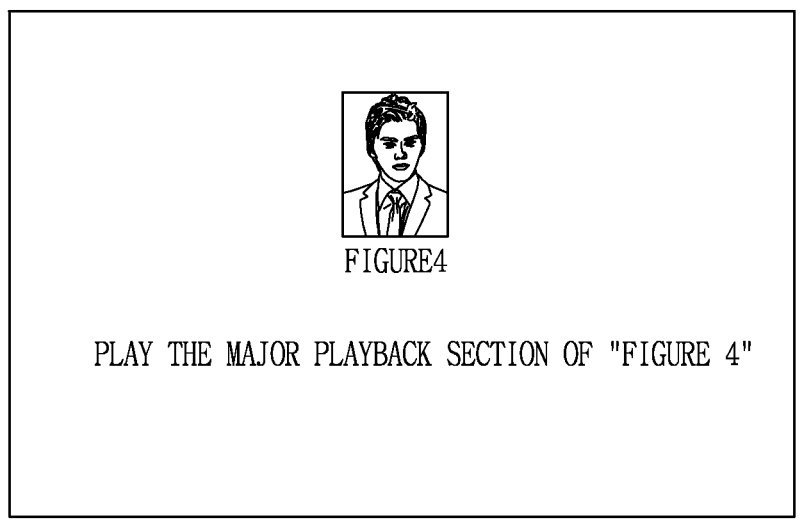

As an example of the method, referring to FIG. 8A, when a specific character playback mode is carried out, a character list for allowing the user to select at least one character may be displayed on the display unit 151. In this case, a menu for executing a specific character playback mode may be preset. When a menu for executing a specific character playback mode is selected by a touch input, an external input device or the like, a character list is displayed.

More specifically, the controller 180 may scan frames provided in video to generate a character list in which characters are arranged in the frequently shown order. For such an example, the present drawing illustrates an example in which FIG. 1 through FIG. 4 are contained in a character list. In other words, the character list may include different figure icons corresponding to the FIG. 1 through FIG. 4.

The different figure icon may be a graphic object representing a character. Each graphic object may include information associated with a character, and a photo image associated with the character may be displayed as a background image.

Next, at least one figure icon may be selected by a touch input. An image display device disclosed herein is formed to allow the display unit to sense a touch input. However, the present disclosure may not be necessarily limited to this, at least one character may be selected by various input schemes such as an external input device such as a remote control, a voice command, or the like.

When a character is selected, the controller 180 extracts a major playback section associated with the selected character, and plays the extracted major playback section.

Figure 8B:
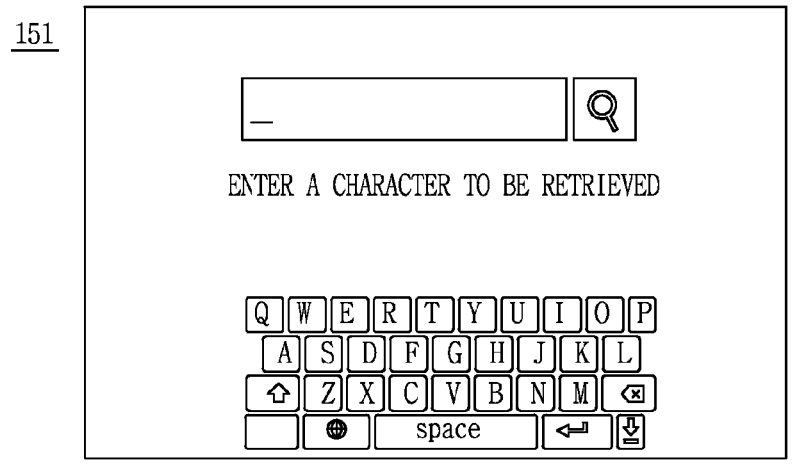
Figure 8B:
Figure 8B:
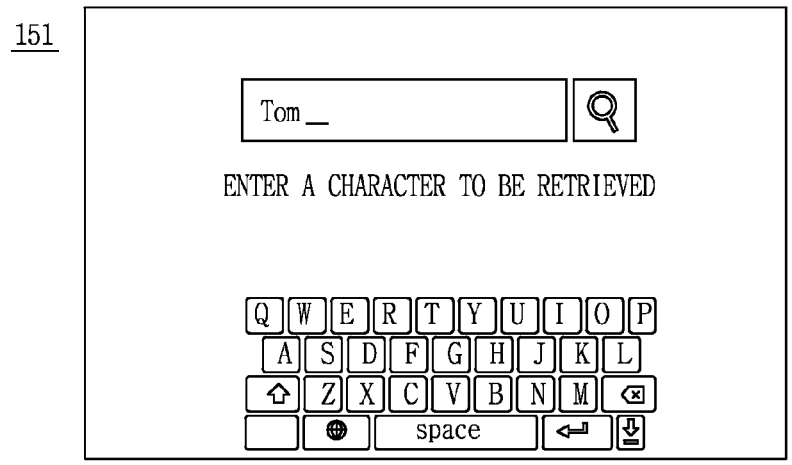
Figure 8B:
Figure 8B:
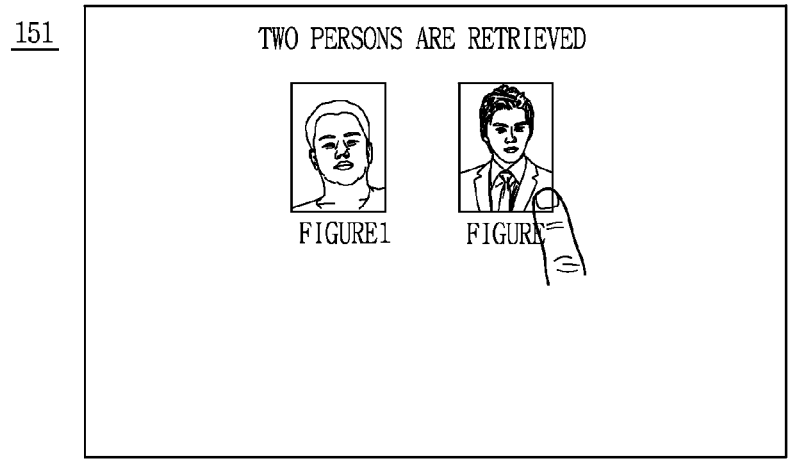

As an example of another method, referring to FIG. 8B, the controller 180 may receive a name of character from the user. More specifically, when a specific character playback mode is executed, an input window and a virtual keypad formed to receive the name of a specific character may be displayed on the display unit 151. Upon receiving a name through the virtual keypad, the controller 180 search a character matching the received name. At this time, the controller 180 may search a matching character using meta data contained in video or request matching character information to a server connected to the Internet.

Then, the controller 180 a character list containing the retrieved character on the display unit 151. Furthermore, the controller 180 may select at least one character based on a touch input.

Figure 8C:
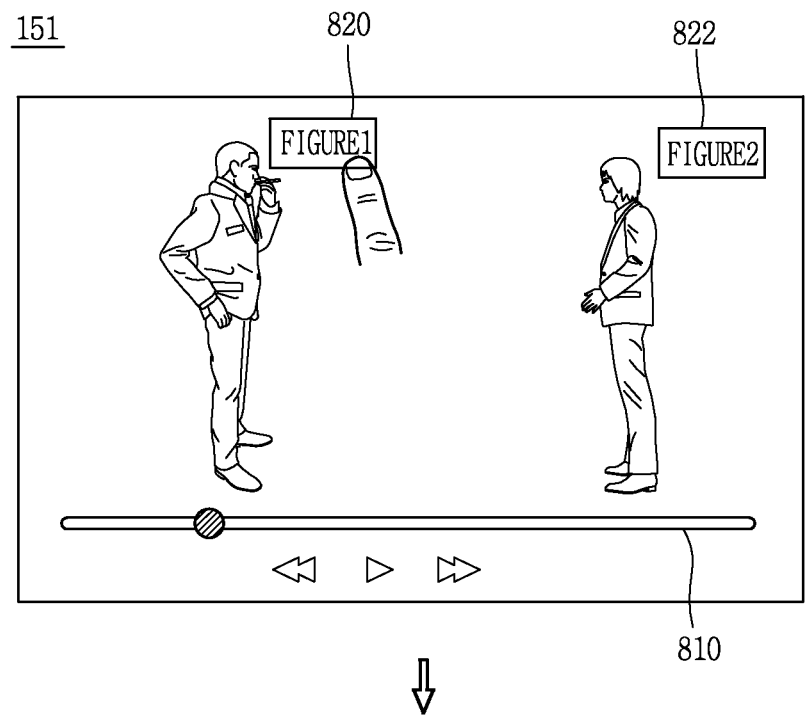
Figure 8C:
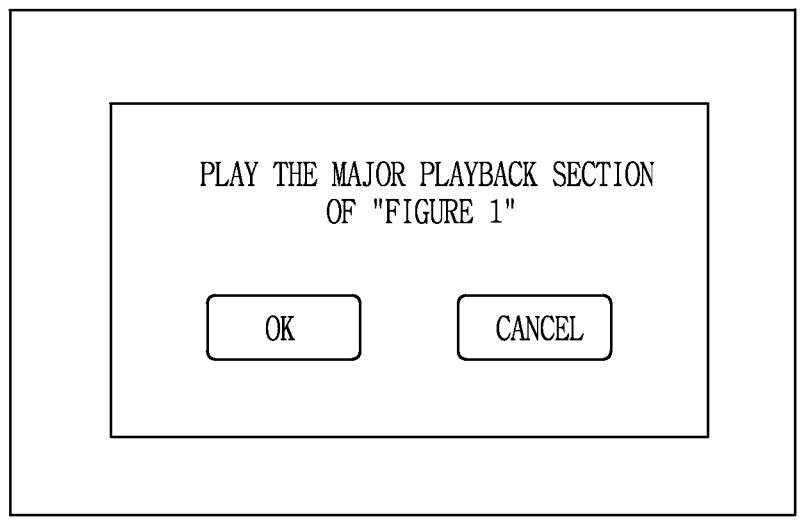

As an example of another method, referring to FIG. 8C, when the playback of video is paused, the controller 180 may display a main progress bar 810 corresponding to the entire playback section of video on the screen of the paused portion. At this time, the controller 180 may display a graphic object for executing a specific character playback mode. More specifically, when video is paused, the controller 180 may search a character contained in the paused screen, and display a graphic object formed to select the retrieved character. For example, when a first and a second figure are contained in the paused screen, a first and a second figure icon 820, 822 corresponding thereto may be displayed. Then, when a touch input to the first figure icon 820 is sensed, the controller 180 executes a specific character playback mode corresponding to the first figure icon.

Figure 8D:
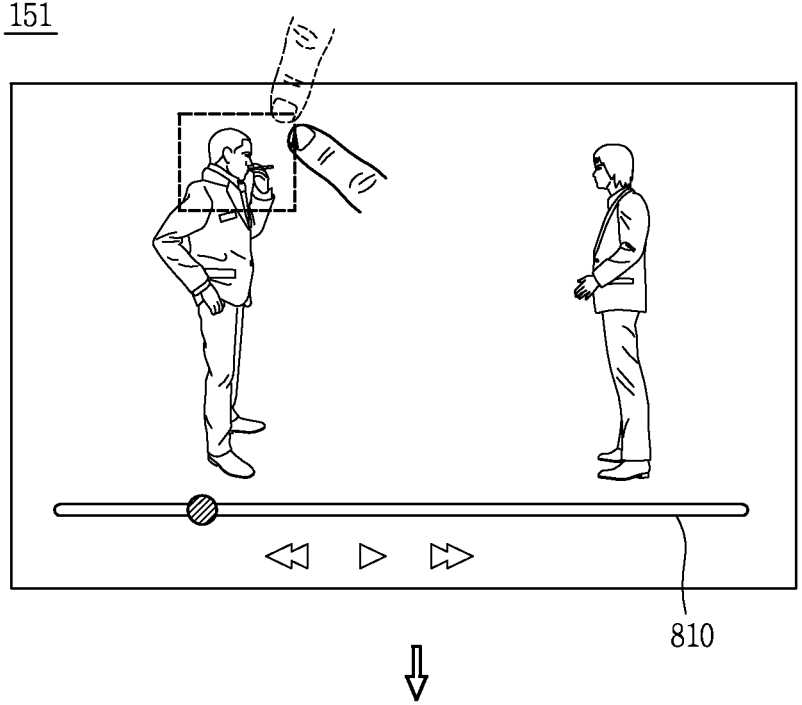
Figure 8D:
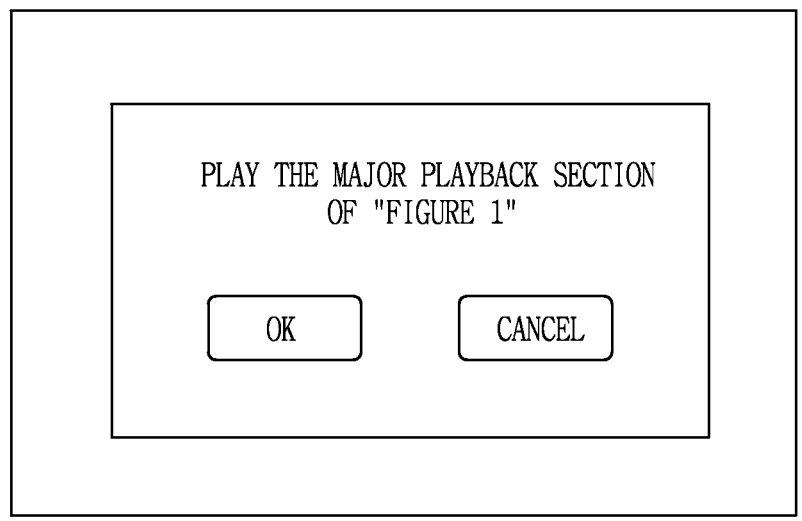

As an example of still another method, referring to FIG. 8D, the controller 180 may sense a user input for specifying a partial region in a state that the playback of video is paused. For example, as illustrated in FIG. 8D, a touch input started from one position may consecutively move and then return to the one position. The controller 180 searches a character contained in a region formed by a touch trajectory, and executes a specific character playback mode for the retrieved character.

Figure 8E:
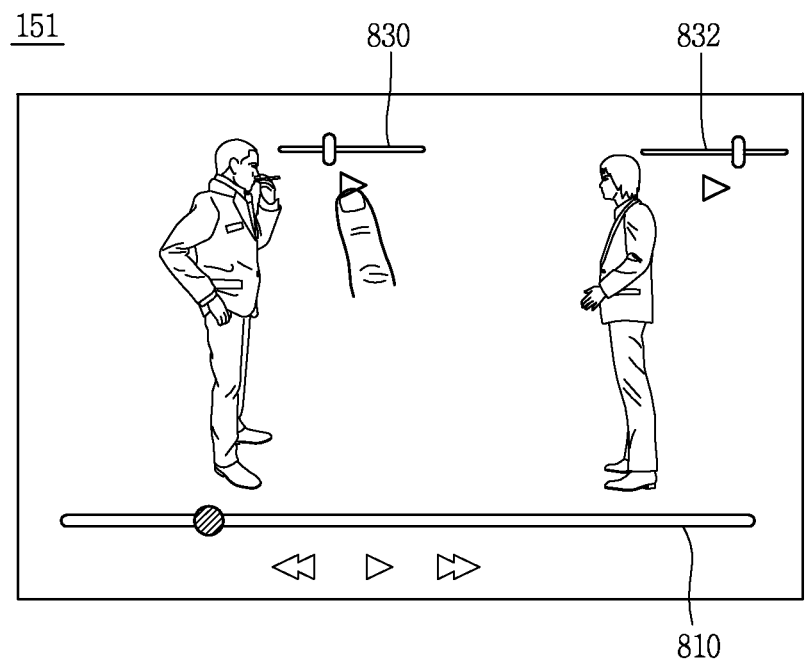

As an example of yet still another method, referring to FIG. 8E, when the playback of video is paused, the controller 180 may extract a major playback section for each of characters contained in the paused screen, and display a progress bar corresponding to each major playback section on the paused screen. More specifically, when the playback of video is paused, the controller 180 search a character contained in the paused screen. Furthermore, the controller 180 extracts a major playback section for each of the retrieved characters, and generates a sub progress bar corresponding to the extracted major playback section. For example, as illustrated in FIG. 8E, when a first and a second figure are contained in the paused screen, a first sub progress bar 830 associated with the first figure and a second sub progress bar 832 associated with the second figure are displayed on the display unit 151. Furthermore, it is characterized in that, each progress bar may include a mark for guiding the paused playback position and a playback icon. When a touch input is sensed on a playback icon contained in the first sub progress bar 830, the controller 180 executes a specific character playback mode for the first figure.

On the other hand, while playing the major playback section, the controller 180 may display at least one of a main progress bar corresponding to the entire playback section of video and a sub progress bar corresponding to a major playback section. FIG. 9 is a conceptual view illustrating various embodiments for displaying the progress bar.

Figure 9A:
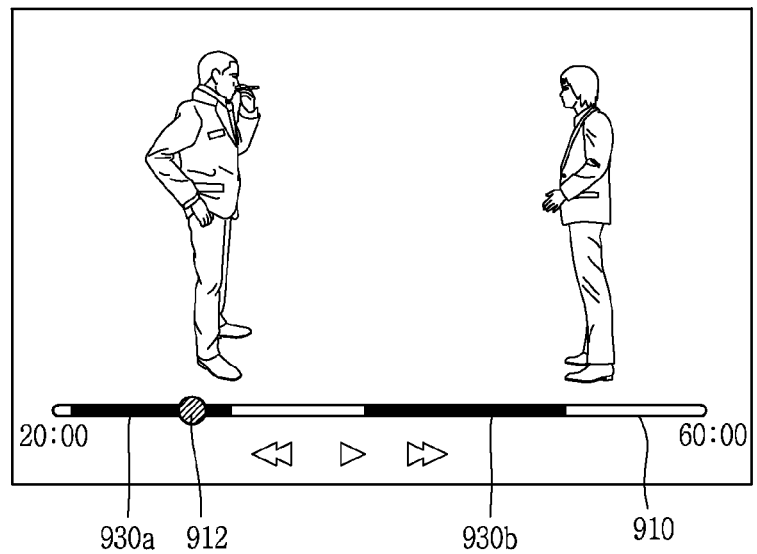
FIGS. 9A, 9B and 9C are conceptual views illustrating various embodiments for displaying a progress bar.

Referring to FIG. 9A, a main progress bar 910 corresponding to the entire playback section of video may be displayed on the display unit 151. The main progress bar 910 may include a first mark 912 for displaying a playback position.

On the other hand, sections 930a, 930b contained in the major playback section are highlighted to be distinguished from sections that are not contained in the major playback section.

When a major playback section is played back, a last frame of the first section 930a and an initial frame of the second section 930b are consecutively connected to each other. In other words, the initial frame of the second section 930b is played back subsequent to the last frame of the first section 930a.

Figure 9B:
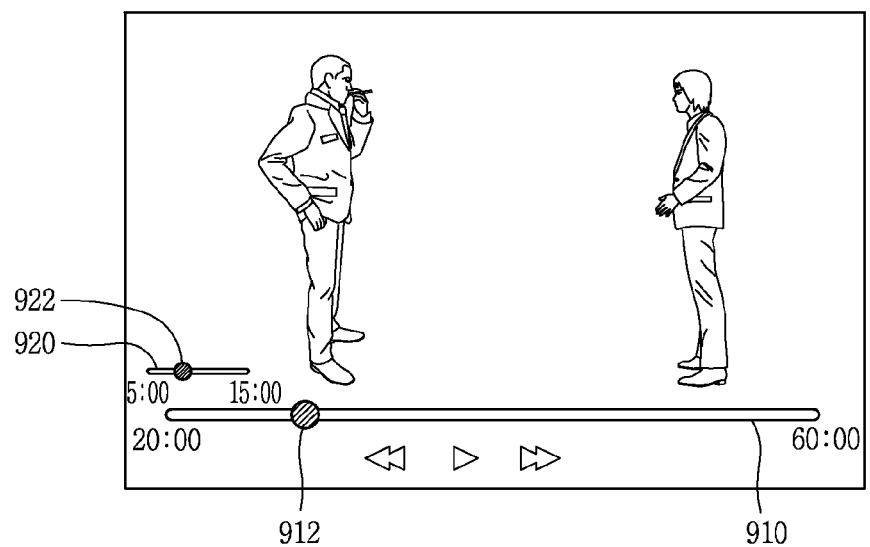
Figure 9C:
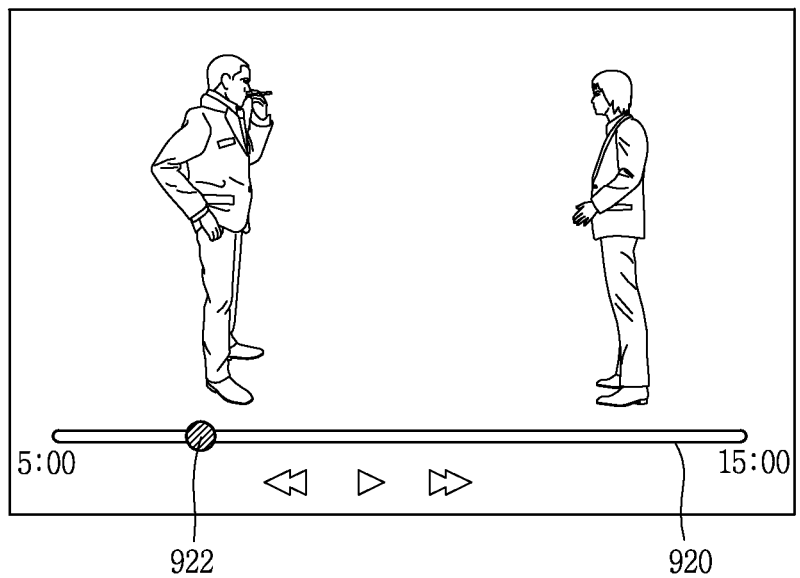

On the other hand, it may be possible to display the main progress bar 910 and sub progress bar 920 at the same time as illustrated in FIG. 9B, or display only the sub progress bar 920 as illustrated in FIG. 9C.

When the main progress bar and sub progress bar are displayed at the same time, the sub progress bar 920 may be displayed at a location adjacent to the main progress bar 910 as illustrated in FIG. 9B. On the contrary, though not shown in the drawing, the sub progress bar may be also displayed around a location displayed with a character associated with the sub progress bar. In other words, the display location of the sub progress bar may vary according to a location at which the character is displayed. The user may check a location at which the sub progress bar is displayed, thereby easily finding a location at which the character is displayed.

Figure 10A:
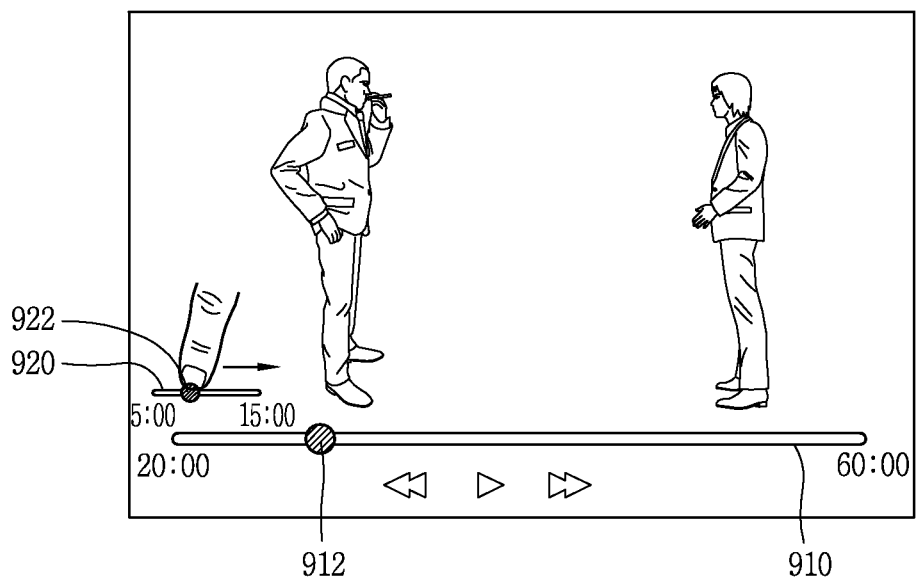
FIGS. 10A and 10B are conceptual views illustrating the control of a progress bar corresponding to a major playback section.
Figure 10A:
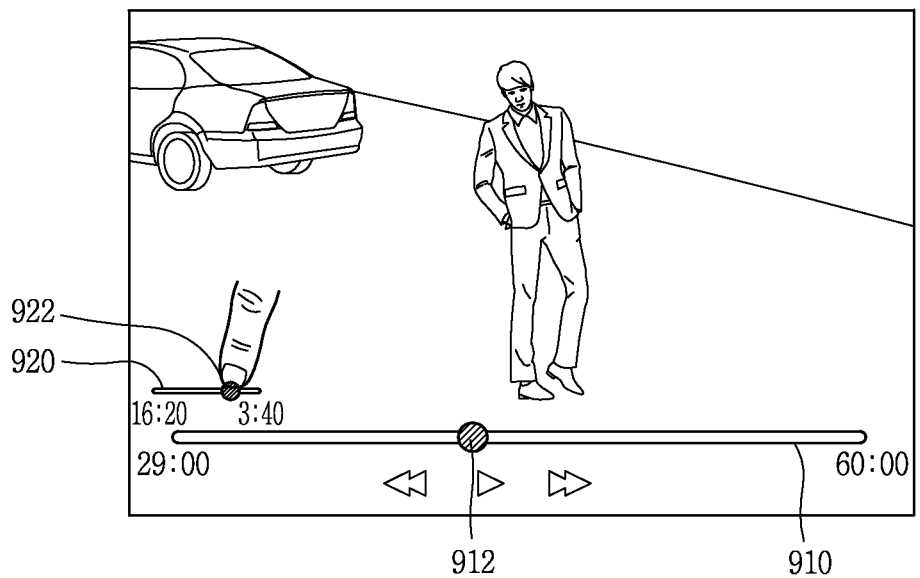
Figure 10B:
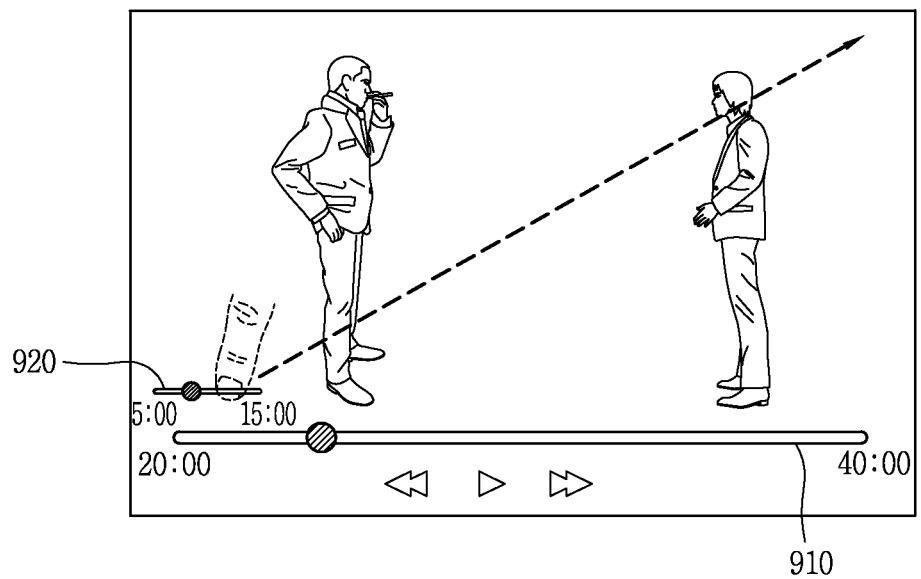
Figure 10B:
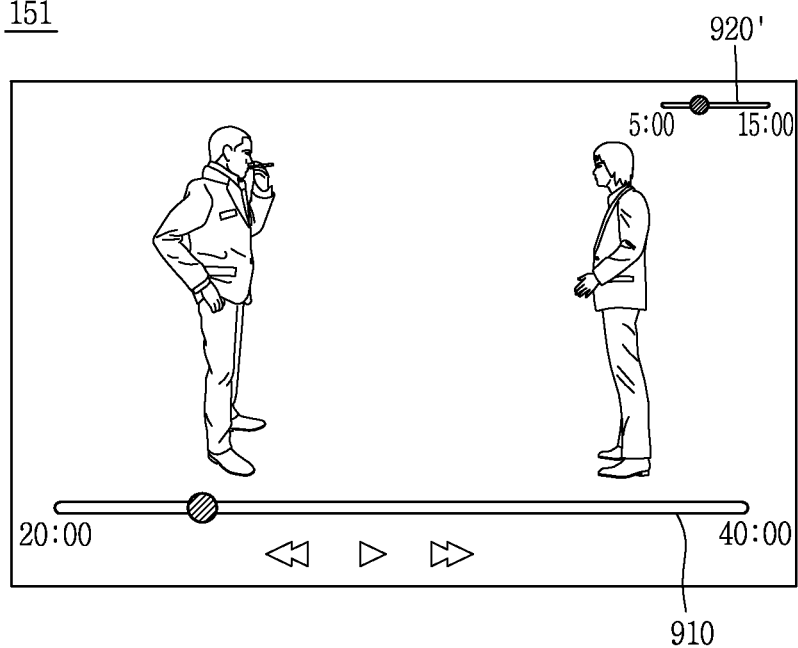

On the other hand, the controller 180 may perform an operation associated with the sub progress bar based on a user input applied to the sub progress bar. FIGS. 10A and 10B are conceptual views illustrating the control of a sub progress bar corresponding to a major playback section.

Referring to FIG. 10A, the controller 180 may sense a drag input to a second mark 922 indicating a playback position of the sub progress bar 920. The playback position may be changed according to the drag input, and a screen corresponding to the changed playback position may be displayed on the display unit 151. Meanwhile, the display location of a first mark 912 indicating a playback position of the main progress bar 910 may be also changed according to a change of the playback position.

In addition, referring to FIG. 10B, the controller 180 may sense a drag input to the sub progress bar 920. The controller 180 changes a location at which the sub progress bar is displayed according to the drag input (920→920'). As a result, the user may move the sub progress bar to his or her desired location.

FIG. 11 is a conceptual view illustrating a method of displaying a major playback section while displaying the main progress bar. The present drawing illustrates an example in which the first through the fourth sections 1110a through 1110d corresponding to a major playback section are highlighted. Furthermore, the main progress bar 910 may include a first mark 912 for guiding a playback position.

While displaying the main progress bar 910, the controller 180 may display a different image associated with the major playback section at a location adjacent to the main progress bar 910. The image may be a profile photo representing a character or a thumbnail image containing a character, and a different image may be displayed according to the playback position. Here, the different image denotes an image having a different shape, length, size, color or the like.

Furthermore, information associated with a character may be displayed on the image. For example, the information may include a name of character, a role of character, a name of performer who plays the character, a performer's resume, and the like.

According to the present drawing, an image is illustrated in a rectangular shape, and a numeral shown in the shape denotes information associated with a character. For example, a rectangle shown with numeral 1 is an image associated with a first character, and a rectangle shown with numeral 1 is an image associated with a first character, and a rectangle shown with numeral 2 is an image associated with a second character.

Figure 11A:
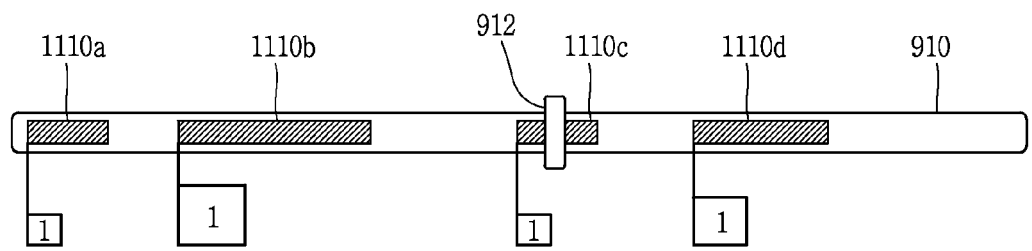
FIGS. 11A, 11B and 11C are conceptual views illustrating a method of displaying a major playback section while displaying a progress bar.

On the other hand, the controller 180 calculates a figure significance of the character for each of a plurality of sections 1110a through 1110d spaced apart in time. According to an embodiment, the controller 180 may calculate a figure significance based on at least one of the size and location of a region in which the character is displayed. Furthermore, the controller 180 may display an image having a different size according to the calculated significance. For example, as illustrated in FIG. 11A, when the figure significance of a first figure is a first level during the first section 1110a and a second level during the second section 1110b, the controller 180 may display an image having a first size at a location corresponding to the first section, and display an image having a second size which is different from the first size at a location corresponding to the second section. Since a relatively larger image is displayed as increasing the figure significance, a figure significance (or weight) in a plurality of sections contained in the major playback section may be shown to the user.

Figure 11B:
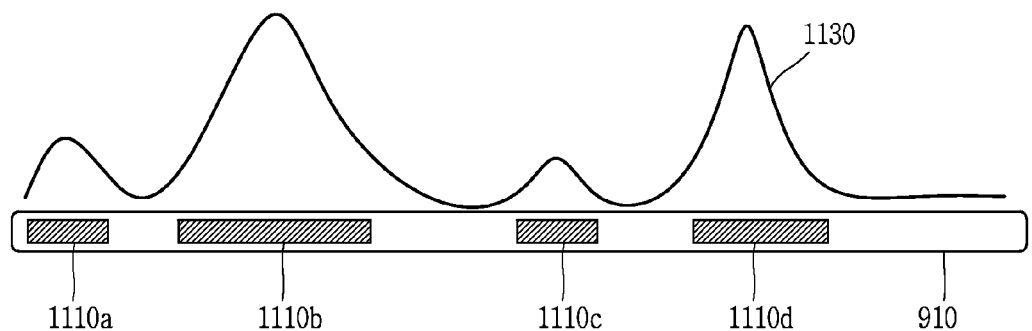

For another example, the controller 180 may calculate the figure significance of a character during the entire playback section of video at each playback position. Furthermore, a significance graph 1130 corresponding to the entire playback section may be displayed according to the calculated significance as illustrated in FIG. 11B. For the significance graph 1130, the controller 180 may display the significance graph 1130 in which a horizontal direction of the main progress bar 910 is set to the x-axis using time as a variable, and the figure significance varies in a y-axis direction.

Figure 11C:
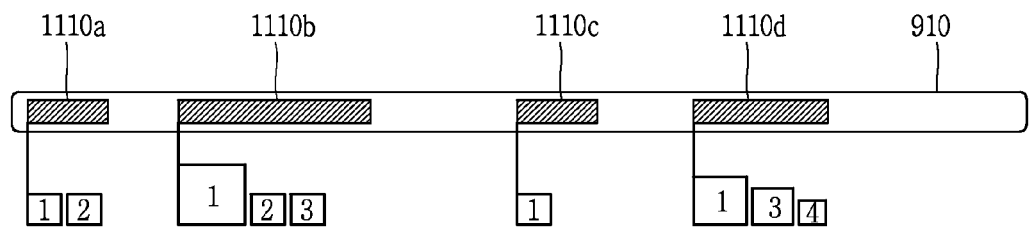

In addition, the controller 180 may calculate a figure significance for a plurality of characters contained in a specific section, and display a different image corresponding to each character around the main progress bar 910. For example, as illustrated in FIG. 11C, when the figure significance of a first and a second figure are the same, the controller 180 may display different images having the same size. When only a first character is contained in the third section 1110c, the controller 180 may display only an image corresponding to the first character. Furthermore, when the figure significance of a first character is a first level, the figure significance of a third character is a second level, and the figure significance of a fourth character is a third level during the fourth section 1110d, the controller 180 may display a different image with a size corresponding to the figure significances, respectively.

Furthermore, the controller 180 may calculate a total appearance time during a specific section for each character, and display an image at a location adjacent to the main progress bar 910 as increasing the total appearance time, and display an image at a location apart from the main progress bar as decreasing the total appearance time. In other words, a distance (or vacant space) between the main progress bar 910 and the image increases as decreasing the total appearance time.

As a result, the user may check a relation between the selected character and another character using a different image displayed around the main progress bar 910.

Figure 12A:
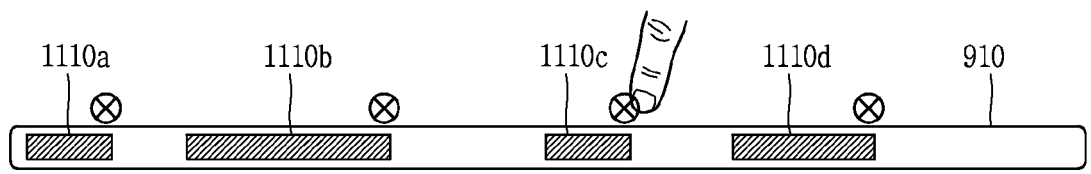
FIGS. 12A, 12B and 12C are conceptual views illustrating a method of editing a major playback section on a progress bar.
Figure 12B:
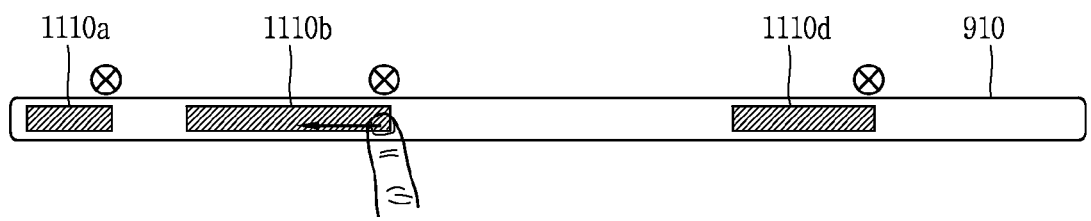
Figure 12C:

On the other hand, the major playback section may be edited by a user input. FIGS. 12A, 12B and 12C are conceptual views illustrating a method of editing a major playback section on the main progress bar in FIGS. 11A, 11B and 11C.

When a long touch is applied to the main progress bar 910 in a state that a plurality of sections 1110a through 1110d contained in the major playback section are highlighted, an edit mode for the major playback section is carried out.

When an edit mode is carried out, as illustrated in FIG. 12A, delete icons (for example, "ⓧ") capable of deleting a plurality of sections 1110a through 1110d are displayed. When a touch input is sensed on any one of the delete icons, a section corresponding to the any one delete icon is deleted from the major playback section as illustrated in FIG. 12B.

Furthermore, when a drag input moving in the left or right direction from any one end of a plurality of sections in a state that an edit mode is carried out, the section may be extended or reduced according to a moving distance of the drag input.

For example, when a drag input moving in the left direction from a right end of the second section 1110b is sensed as illustrated in FIG. 12B, the second section may be reduced (1110b→1110b').

On the contrary, when a drag input moving in the right direction from a right end of the second section 1110b, the second section may be extended. At this time, when a drag input approaches the left end of the fourth section 1110d, the second section 1110b and the fourth section 1110d can be merged into one section.

Figure 13A:
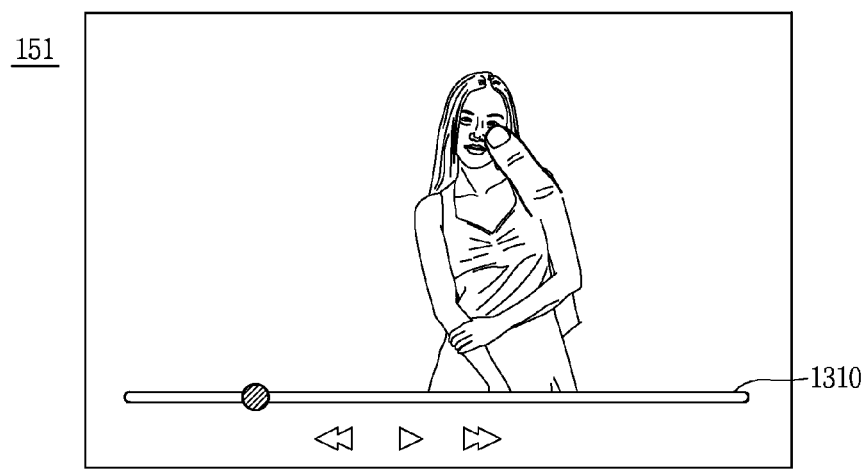
FIGS. 13A, 13B and 13C are views for explaining a method of executing a specific character playback mode during the playback of video in an image display device according to an embodiment of the present disclosure.
Figure 13B:
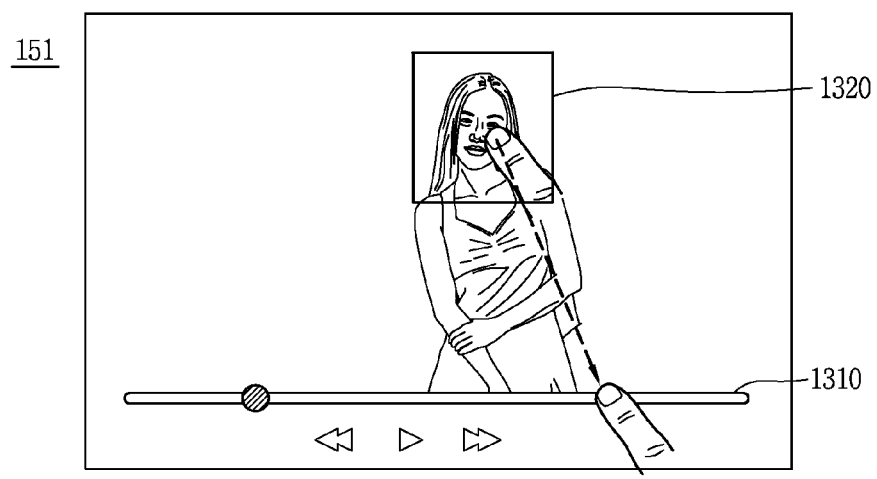
Figure 13C:
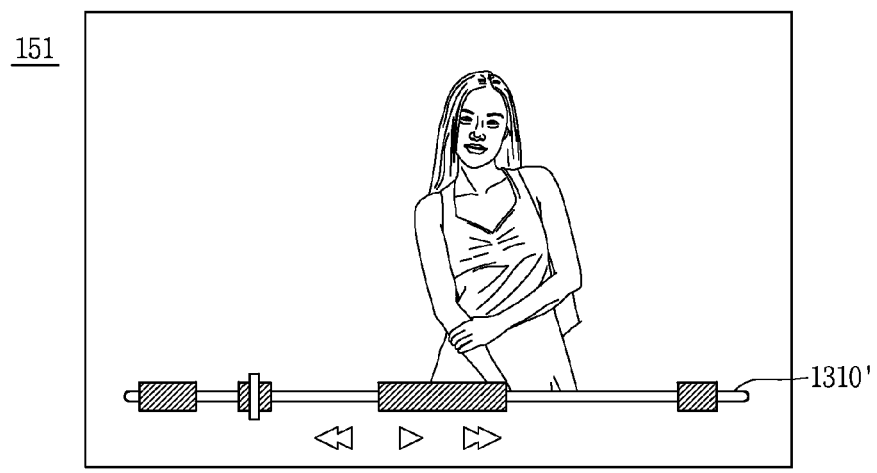

FIGS. 13A, 13B and 13C are views for explaining a method of executing a specific character playback mode during the playback of video in an image display device according to an embodiment of the present disclosure.

Referring to FIG. 13A, the controller 180 may select at least one character during the playback of video based on a user input applied to the display unit 151.

For example, when a long touch is applied to one position of the display unit 151 during the playback of video as illustrated in FIG. 13A, the controller 180 searches a character displayed in a region containing a position at which the long touch is applied. When the character is retrieved, as illustrated in FIG. 13B, the controller 180 may display a graphic object 1320 corresponding to the recognized character on the display unit 151.

When a long touch consecutively moves from an initial touch position to a region in which the main progress bar 1310 is displayed in a state that the graphic object 1320 is displayed, the controller 180 selects the recognized character, and executes a specific character playback mode for the selected character. In other words, the controller 180 extracts a major playback section associated with the selected character, and plays the extracted major playback section.

When a specific character playback mode is carried out, sections contained in the major playback section on the main progress bar are highlighted to be distinguished from sections that are not contained in the major playback section (1310→1310').

On the other hand, when a specific character playback mode is carried out, at least one of the main progress bar and the sub progress bar is displayed on the display unit 151. The controller 180 selects any one progress bar based on a user input, and plays a playback section corresponding to the selected progress bar. For example, the entire playback section of video is consecutively played back when the main progress bar is selected, and the major playback section is consecutively played back when the sub progress bar is selected.

Hereinafter, a method of changing a progress bar (or method of selecting any one progress bar) will be described in more detail with reference to FIGS. 14, 15A, 15B and 15C. FIGS. 14, 15A, 15B and 15C are views illustrating a method of changing a progress bar.

Figure 14:
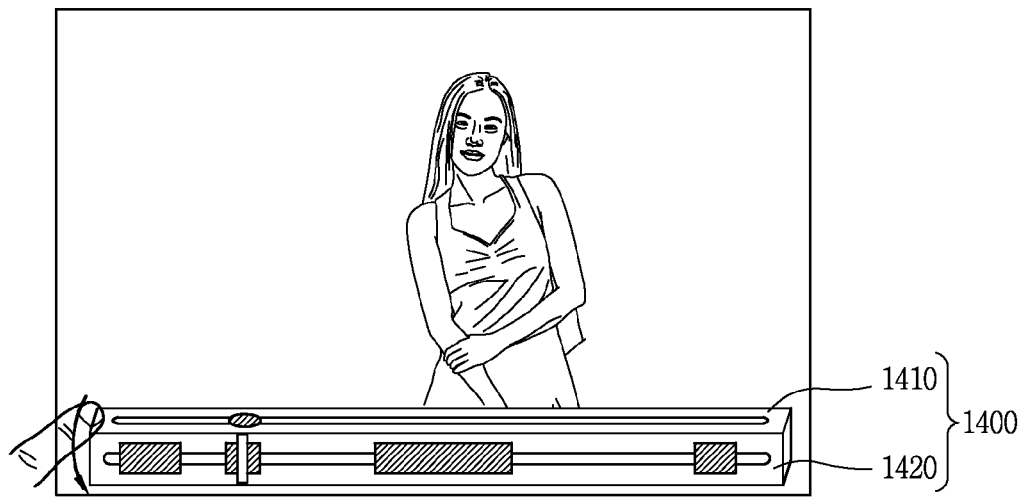
FIGS. 14, 15A, 15B and 15C are views illustrating a method of changing a progress bar in an image display device according to an embodiment of the present disclosure.
Figure 14:
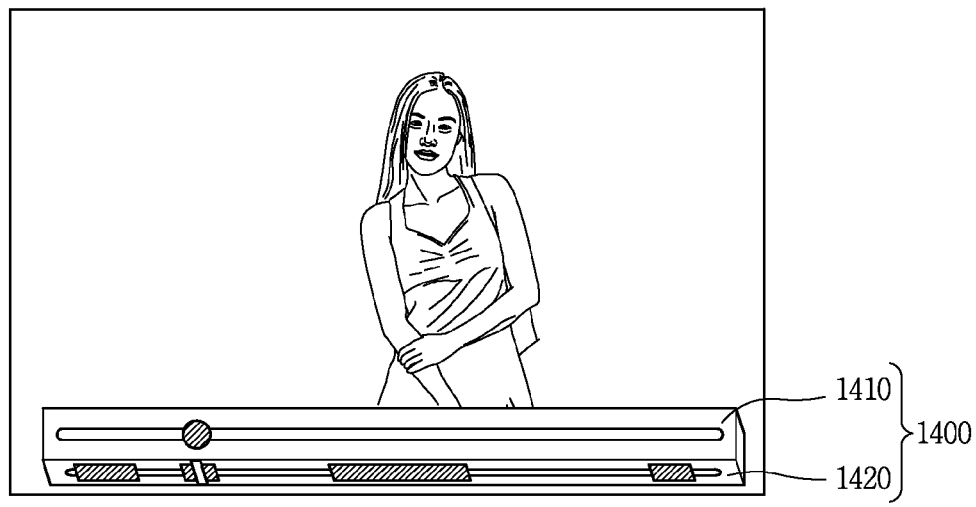

The controller 180 may display the main progress bar 1410 and sub progress bar 1420 at the same time on the display unit 151. For example, as illustrated in FIG. 14, the controller 180 may display the main progress bar 1410 on any one surface of a hexahedron 1400, and display the sub progress bar 1420 on another surface which is different from the one surface.

At this time, the controller 180 may control a progress bar corresponding to a playback section currently being played back to be located in a front direction of the display unit 151. For example, as illustrated in FIG. 14, when the major playback section is being played back, the sub progress bar 1420 is located in a front direction (or a front direction with respect to the display unit 151) of the hexahedron 1400, and the main progress bar 1410 may be located in a planar direction of the hexahedron 1400.

A plurality of progress bars may be displayed using various types of polyhedrons as well as a hexahedron. When any one progress bar is located in a front direction of the display unit 151, another progress bar may be located in a different direction according to the type of polyhedron.

On the other hand, a gesture of rotating the hexahedron 1400 may be applied. More specifically, when a touch applied to the hexahedron 1400 moves in a curve shape, the controller 180 may rotate the hexahedron 1400 based on a moving direction of the touch. For example, when a touch applied to an upper surface of the hexahedron 1400 moves in a counter clockwise direction, the hexahedron 1400 rotates as illustrated in FIG. 14. According to the rotation of the hexahedron 1400, a progress bar located in a front direction of the display unit 151 is changed from the sub progress bar 1420 to the main progress bar 1410. In other words, the main progress bar 1410 is selected to play the entire playback section of video.

On the other hand, when a specific character playback mode is carried out, the controller 180 may extract one major playback section or extract a plurality of major playback sections. More specifically, the controller 180 may calculate a figure significance based on at least one of the size and location of a character contained in a frame, and extract different major playback sections based on the figure significance.

Hereinafter, a method of selecting any one progress bar that has extracted a first through a third major playback section, for example, will be described in detail. The first major playback section may include frames having a first figure significance, and the second major playback section may include frames having a second figure significance, and the third major playback section may include frames having a third figure significance. Accordingly, a total playback time increases as decreasing the level of the figure significance.

Figure 15A:
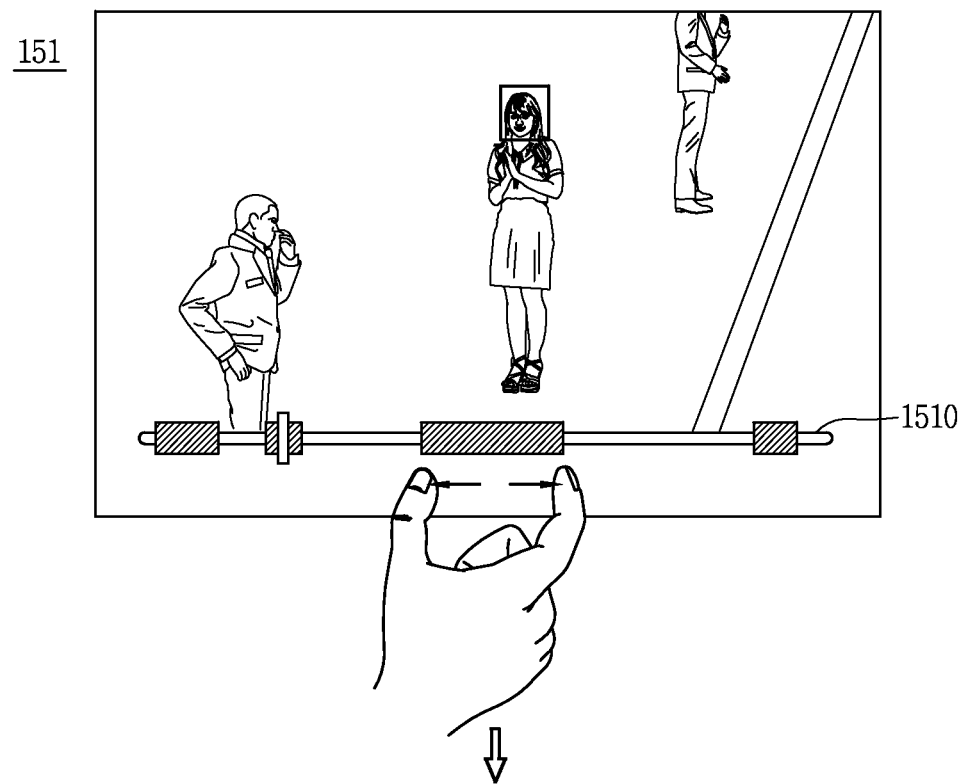
Figure 15A:
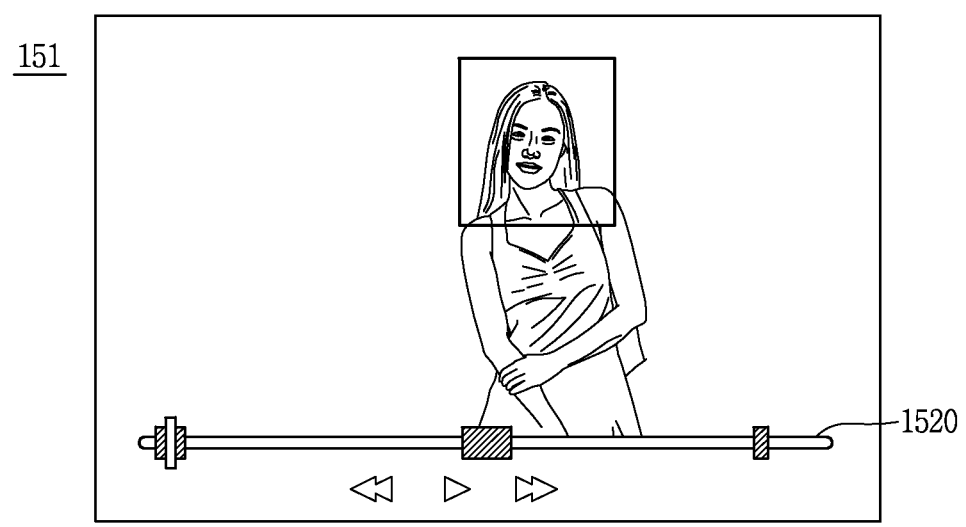

Referring to FIG. 15A, a pinch-in gesture to a second sub progress bar 1510 may be sensed in a state that the second sub progress bar 1510 corresponding to the second major playback section.

Here, pinch-in gesture denotes a gesture of widening two fingers in contact with the screen, and pinch-out gesture denotes a gesture of narrowing two fingers in contact with the screen as a gesture opposite to the pinch-in gesture.

The controller 180 may display a first sub progress bar 1520 corresponding to the first major playback section having a higher level than that of the second major playback section being displayed in response to a pinch-in gesture. Furthermore, the controller 180 consecutively plays the first major playback section other than the second major playback section. In other words, frames having a relatively higher significance are played back by the pinch-in gesture.

Figure 15B:
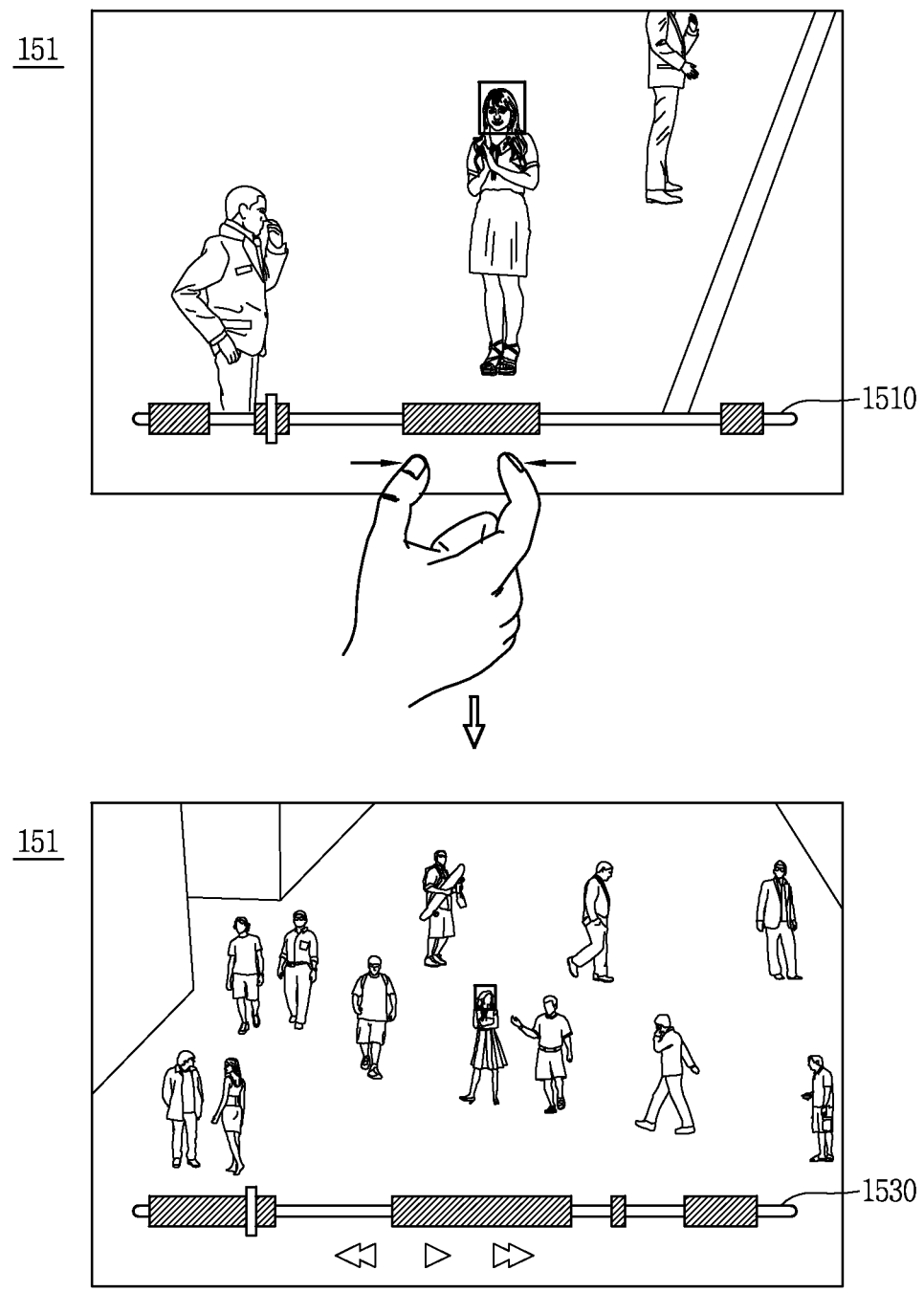

On the contrary, as illustrated in FIG. 15B, a pinch-out gesture to the second sub progress bar 1510 may be sensed in a state that the second sub progress bar 1510 is shown. The controller 180 may display a third sub progress bar 1530 corresponding to a third main progress bar having a lower level than that of the second major playback section being displayed in response to the pinch-out gesture. Furthermore, the controller 180 consecutively plays the third major playback section other than the second major playback section.

Figure 15C:
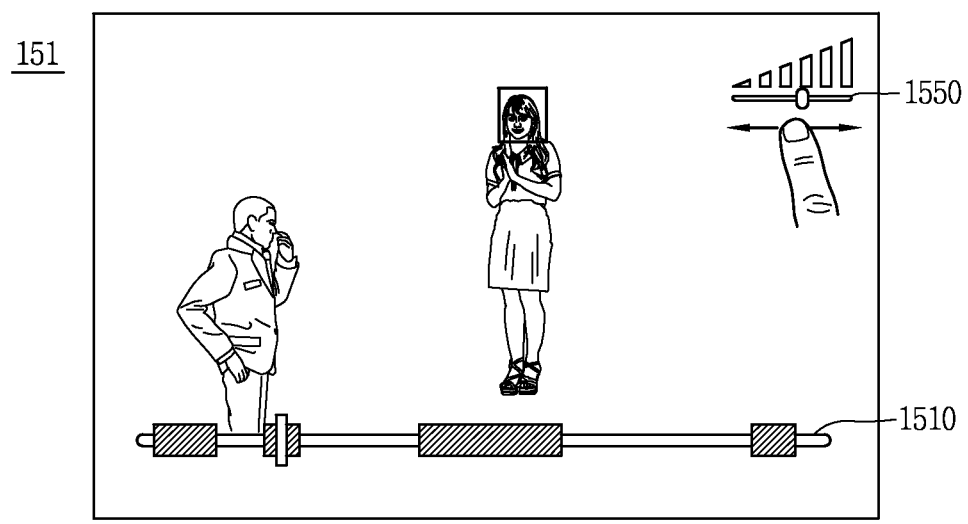

On the other hand, referring to FIG. 15C, the controller 180 may display a section adjustment bar 1550 capable of changing a playback subject. More specifically, the controller 180 may display the section adjustment bar 1550 formed to adjust the significance of a figure to be seen.

A left end of the section adjustment bar 1550 corresponds to a minimum level (or minimum phase), and a right end thereof corresponds to a maximum level (or maximum phase). In other words, a major playback section corresponding to the minimum level is played back when a left end thereof is selected on the section adjustment bar 1550, and a major playback section corresponding to the maximum level is played back when a right end thereof is selected.

Accordingly, sections contained in the major playback section (for example, highlighted sections on the main progress bar) displayed on the main sub progress bar 1510 vary. For example, sections contained in the major playback section decrease as being closer to the maximum level, and sections contained in the major playback section increase as being closer to the minimum level. The user may conveniently select a phase (or level) desired to be seen using the section adjustment bar 1550.

Figure 16:
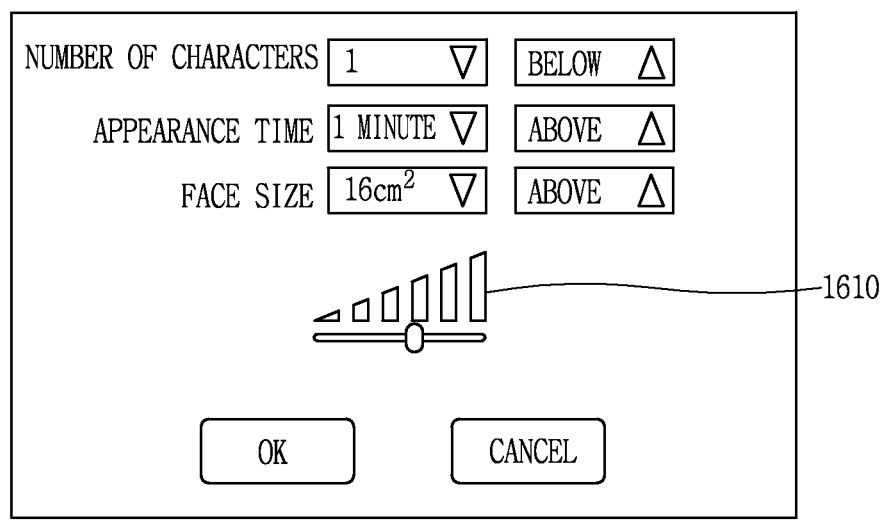
FIG. 16 is a conceptual view illustrating a method of receiving a criteria for extracting a major playback section from a user in an image display device according to an embodiment of the present disclosure.

On the other hand, a criteria for extracting the major playback section is preset as a factory default setting. However, the criteria may be changed by a user. FIG. 16 is a conceptual view illustrating a method of receiving a criteria for extracting a major playback section from a user in an image display device according to an embodiment of the present disclosure.

The controller 180 may display a criteria for extracting a major playback section on the display unit 151 prior to extracting the major playback section. More specifically, a number of characters contained in a frame, a period of time of a character consecutively shown, a character's face size, and the like may be displayed as a criteria for extracting the main progress bar on the display unit 151 in order to extract the major playback section. For example, when the number of characters is set to "one or less", a frame containing two or more characters is removed from the major playback section. Furthermore, when the appearance time is set to "above one minute", only a frame in which the character is shown for more than one minute is added to the major playback section. Furthermore, when the face size is set to "above 16 cm²", only a frame in which the face area of the character is above 16 cm² is added to the major playback section.

Furthermore, the controller 180 may allow the user to select a figure significance to be seen using a section adjustment bar. As a result, it may be possible to provide a user friendly user interface.

Though not shown in the drawing, when a touch input is applied to a region in which the main progress bar 910 is not displayed, an edit mode being executed is terminated.

On the other hand, the controller 180 may play the major playback section as well as store it as a separate file different from the original video. Furthermore, video corresponding to the major playback section may be transmitted to an external server to be shared with other devices.

As described above, the present disclosure may play a main progress bar associated with a specific character, thereby providing a new type of user convenience. Furthermore, it may be possible to solve the user's need for playing only a portion in which a specific figure is close-up by focusing on the relevant figure. More specifically, all the sections in which a specific figure is shown may be extracted to selectively edit or play video based on the size and location of a region containing the character. For example, when an image display device according to the present disclosure is used, the user may extract, store and play only sections in which his or her kid has come out well from the entire video in which a school play is shot. For another example, when an image display device according to the present disclosure is used, the user may extract, store and play only sections in which a specific player is shown as a key figure from the entire video in which a baseball game is shot.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A method for controlling a display device, the method comprising:
   identifying portions of a video that include a person selected by a user;
   defining a major playback section of the video as including one or more of the identified portions of the video and that satisfy a preset criteria, wherein the preset criteria comprise at least one of a length of a scene or portion of the video including the selected person, a position of the selected person in a scene or portion of the video, or a proportion of the selected person in a scene or portion of the video;
   displaying, on a display of the display device, the major playback section of the video;
   displaying a progress bar indicating a playback status of the video while displaying the major playback section of the video, wherein the major playback section comprises a plurality of sections that are spaced apart from each other; and
   displaying a plurality of indicators including a first indicator and a second indicator, each indicator accompanying a corresponding one of the plurality of sections, and each indicator indicating a significance level of the corresponding one of the plurality of sections with respect to the selected person, wherein a first size of the first indicator indicating a first significance level is different from a second size of the second indicator indicating a second significance level.

2. The method of claim 1,
   wherein the progress bar comprises a first progress bar corresponding to an entire playback section of the video and a second progress bar corresponding to the major playback section.

3. The method of claim 2, further comprising:
   displaying the first progress bar and the second progress bar overlappingly; and
   displaying the second progress bar overlapping a first portion of the first progress bar distinguishably such that the second progress bar is distinguishable within the first progress bar from a second portion of the first progress bar that represents a section of the video that does not correspond to the major playback section.

4. The method of claim 2, wherein:
   the first progress bar and the second progress bar are displayed independently such that the first progress bar indicates a currently played position of the video within the entire playback section of the video, and the second progress bar indicates the currently played position within the major playback section; and
   each of the plurality of sections corresponds to one of the second progress bar.

5. The method of claim 1, wherein the significance level is determined based on at least a size or a location of the selected person in a scene or portion of the video.

6. The method of claim 1, wherein the displaying the major playback section comprises displaying frames included in the plurality of sections consecutively.

7. The method of claim 1, further comprising:
   editing the major playback section in response to a user input received via the progress bar.

8. The method of claim 1, wherein the selection of the person comprises:
   identifying a person or a face of the person included in a paused scene of the video that is paused during playback of the video;
   displaying a graphic object for selecting the identified person on the paused screen; and
   selecting the identified person in response to a touch applied to the graphic object.

9. An image display device, comprising:
   a display configured to display video; and
   a controller configured to:
     identify portions of the video that include a person selected by a user;
     define a major playback section of the video as including one or more of the identified portions of the video and that satisfy a preset criteria, wherein the preset criteria comprise at least a length of a scene or portion of the video including the selected person, a position of the selected person in a scene or portion of the video, or a proportion of the selected person in a scene or portion of the vide;
     cause the display to display the major playback section of the video;
     cause the display to display a progress bar indicating a playback status of the video while displaying the major playback section of the video, wherein the major playback section comprises a plurality of sections that are spaced apart from each other; and
     cause the display to display a plurality of indicators including a first indicator and a second indicator, each indicator accompanying a corresponding one of the plurality of sections, and each indicator indicating a significance level of the corresponding one of the plurality of sections with respect to the selected person, wherein a first size of the first indicator indicating a first significance level is different from a second size of the second indicator indicating a second significance level.

10. The image display device of claim 9, wherein
    the progress bar comprises a first progress bar corresponding to an entire playback section of the video and a second progress bar corresponding to the major playback section.

11. The image display device of claim 10, wherein the controller is further configured to cause the display to:
    display the first progress bar and the second progress bar overlappingly; and display the second progress bar overlapping a first portion of the first progress bar distinguishably such that the second progress bar is distinguishable within the first progress bar from a second portion of the first progress bar that represents a section of the video that does not correspond to the major playback section.

12. The image display device of claim 10, wherein:
the first progress bar and the second progress bar are displayed independently such that the first progress bar indicates a currently played position of the video within the entire playback section of the video, and the second progress bar indicates the currently played position within the major playback section; and
each of the plurality of sections corresponds to one of the second progress bar.

13. The image display device of claim 9, wherein the significance level is determined based on at least a size or a location of the selected person in a scene or portion of the video.

14. The image display device of claim 9, wherein the controller is further configured to cause the display to display frames included in the plurality of sections consecutively.

15. The image display device of claim 9, wherein the controller is further configured to edit the major playback section in response to a user input received via the progress bar.

16. The image display device of claim 9, wherein the controller is further configured to:
identify a person or a face of the person included in a paused scene of the video that is paused during playback of the video;
cause the display to display a graphic object for selecting the identified person on the paused screen; and
select the identified person in response to a touch applied to the graphic object.

* * * * *